US009079271B2

(12) United States Patent
Dwileski, Jr.

(10) Patent No.: US 9,079,271 B2
(45) Date of Patent: Jul. 14, 2015

(54) STRUCTURAL CONNECTION ALIGNING DEVICE

(75) Inventor: Mark Dwileski, Jr., East Greenbush, NY (US)

(73) Assignee: PIPESNAPPER WELDING SUPPLY LLC, East Greenbush, NY (US)

( * ) Notice: Subject to any disclaimer, the term of this patent is extended or adjusted under 35 U.S.C. 154(b) by 0 days.

(21) Appl. No.: 13/600,429

(22) Filed: Aug. 31, 2012

(65) Prior Publication Data
US 2012/0318849 A1 Dec. 20, 2012

Related U.S. Application Data

(60) Division of application No. 11/935,630, filed on Nov. 6, 2007, now Pat. No. 8,266,776, which is a continuation-in-part of application No. 11/036,848, filed on Jan. 14, 2005.

(51) Int. Cl.
B25B 27/14 (2006.01)
B25B 1/20 (2006.01)
B23K 37/04 (2006.01)
B23Q 3/00 (2006.01)
B23K 37/053 (2006.01)

(52) U.S. Cl.
CPC ....... *B23K 37/0533* (2013.01); *Y10T 29/49895* (2015.01); *Y10T 29/53913* (2015.01); *Y10T 29/53917* (2015.01)

(58) Field of Classification Search
USPC .............. 29/271, 272, 464; 269/2, 6, 43, 268; 228/44.5, 49.3, 212
See application file for complete search history.

(56) References Cited

U.S. PATENT DOCUMENTS

| | | | |
|---|---|---|---|
| 2,800,867 A | 7/1957 | Smith | |
| 3,016,855 A | 1/1962 | Wimmer | |
| 3,207,326 A | 9/1965 | Enix | |
| 3,266,700 A | 8/1966 | Bauer et al. | |
| 3,400,872 A | 9/1968 | Rogers | |
| 3,422,519 A | 1/1969 | Fehlman | |
| 3,427,016 A | 2/1969 | Harris | |
| 3,593,402 A | 7/1971 | Mori | |
| 3,596,898 A | 8/1971 | Hilburn | |
| 3,705,453 A | 12/1972 | Olson | |
| 3,894,326 A | 7/1975 | Merriman | |
| 3,898,714 A | 8/1975 | McFadden | |

(Continued)

OTHER PUBLICATIONS

U.S. Appl. No. 11/935,630; Filing Date Nov. 6, 2007; GAU 3726.

(Continued)

*Primary Examiner* — Essama Omgba
(74) *Attorney, Agent, or Firm* — Schmeiser Olsen & Watts LLP

(57) ABSTRACT

A device for aligning structural elements to be connected is presented. In particular, the present invention relates to providing an end of a first structural element and an end of a second structural element; providing an aligning device including a head configured to be removably secured proximate the end of the first structural element, the aligning device further including an alignment element attached to the head, the alignment element having a rotatably secured plunging body extendable from the head; extending the plunging body from the head to non-rotatably engage the second structural element; and moving the non-rotatably engaged second structural element via extension of the plunging body to align the end of the second structural element with the end of the first structural element.

19 Claims, 18 Drawing Sheets

(56) References Cited

U.S. PATENT DOCUMENTS

| | | | |
|---|---|---|---|
| 3,925,854 A | 12/1975 | McFadden | |
| 3,933,292 A | 1/1976 | Martin | |
| 4,174,996 A | 11/1979 | Hunter | |
| 4,356,615 A | 11/1982 | Dearman | |
| 4,378,937 A | 4/1983 | Dearman | |
| 4,483,059 A | 11/1984 | Dearman | |
| 4,893,393 A | 1/1990 | Marshall | |
| 5,165,160 A | 11/1992 | Poncelet | |
| 5,560,091 A | 10/1996 | Labit, Jr. | |
| 6,159,217 A | 12/2000 | Robie et al. | |
| 6,302,410 B1 | 10/2001 | Wentworth et al. | |
| 6,635,072 B1 | 10/2003 | Ramamurti et al. | |
| 7,328,874 B2 | 2/2008 | Tenma et al. | |
| 7,398,909 B2 | 7/2008 | Dick | |
| 8,266,776 B2 * | 9/2012 | Dwileski, Jr. | 29/271 |
| 8,313,016 B2 * | 11/2012 | Dagenais | 228/9 |
| 2005/0011928 A1 | 1/2005 | Dick | |
| 2006/0156531 A1 | 7/2006 | Dwileski, Jr. | |
| 2007/0256288 A1 | 11/2007 | Vermaat | |
| 2008/0256770 A1 | 10/2008 | Dwileski, Jr. | |
| 2008/0263849 A1 | 10/2008 | Dwileski | |
| 2008/0263850 A1 | 10/2008 | Dwileski | |
| 2012/0074205 A1 * | 3/2012 | Dagenais | 228/102 |
| 2013/0067709 A1 * | 3/2013 | Bender | 29/272 |

OTHER PUBLICATIONS

Notice of Allowance (Mail Date May 23, 2012) for U.S. Appl. No. 11/935,630, filed Nov. 6, 2007; GAU 3726; Confirmation No. 8272.

U.S. Appl. No. 11/036,848, filed Jan. 14, 2005; GAU 3726.

* cited by examiner

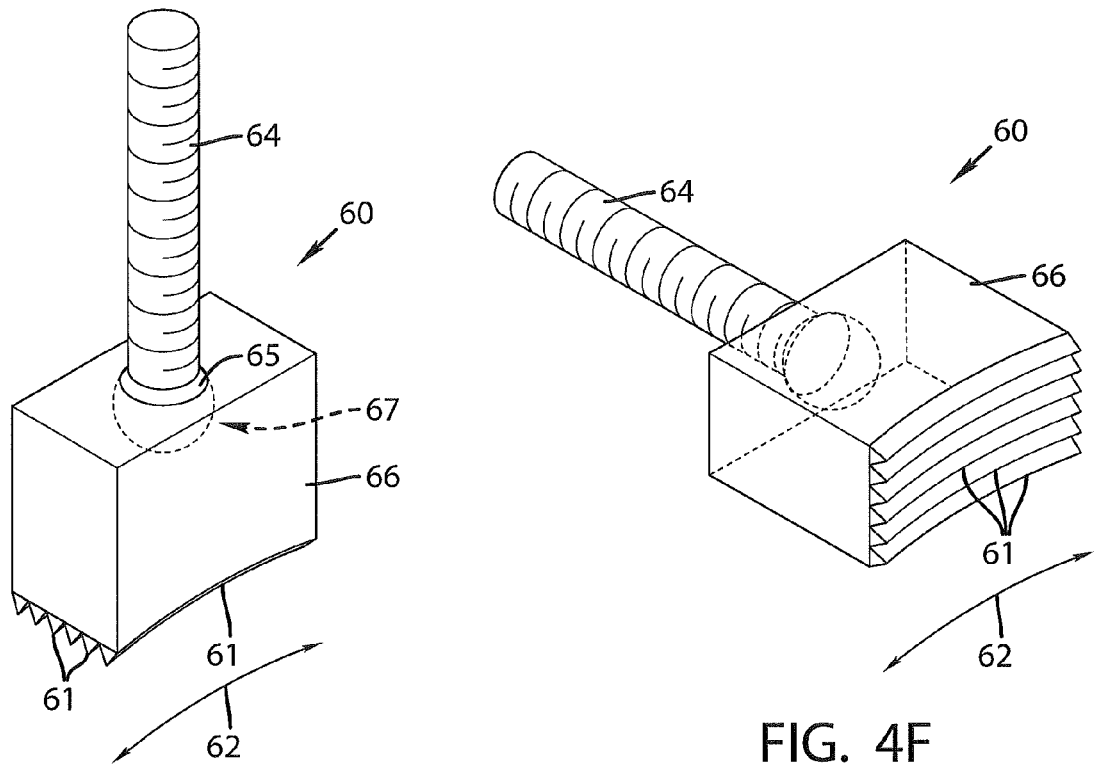
FIG. 4E
FIG. 4F
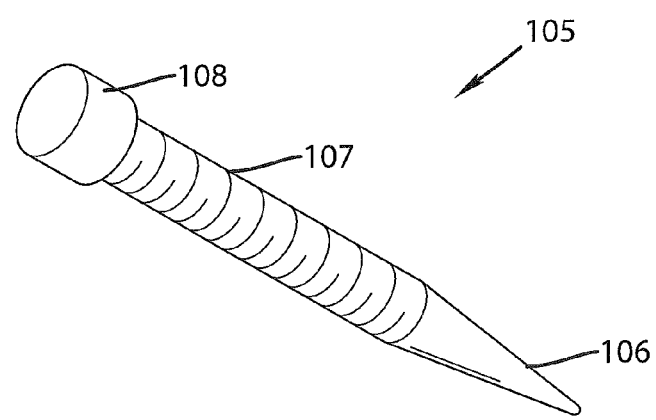
FIG. 5

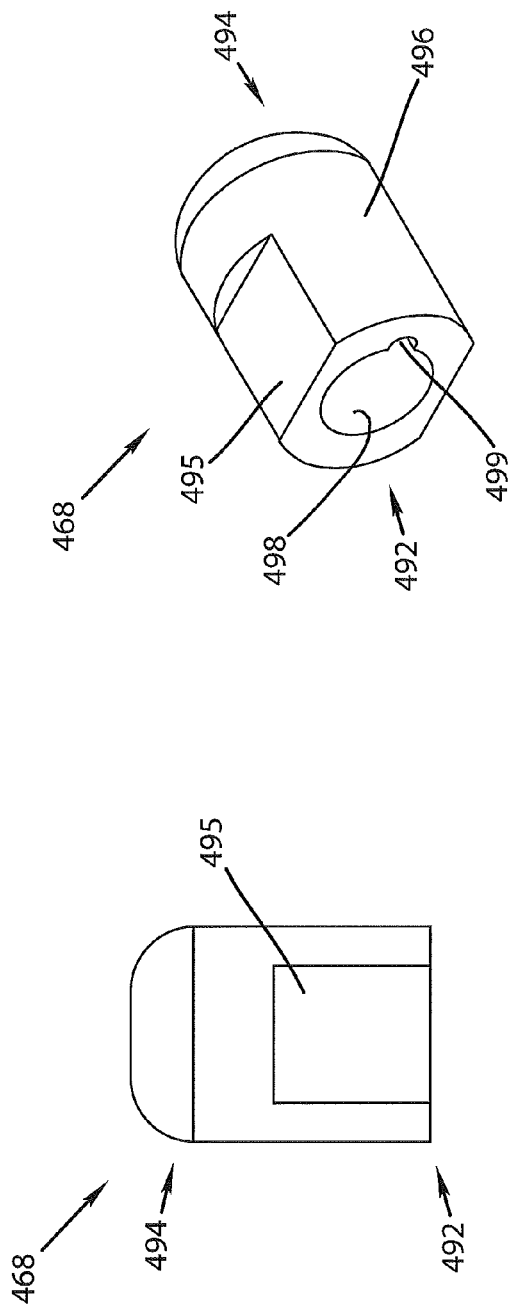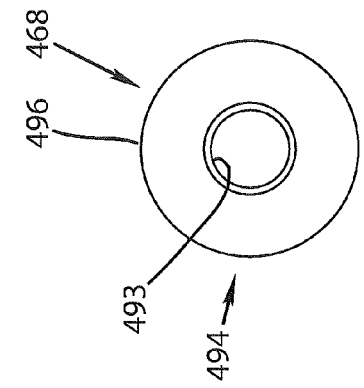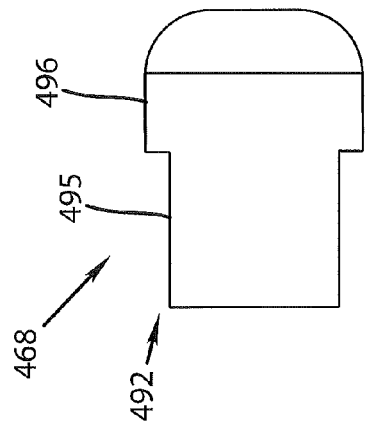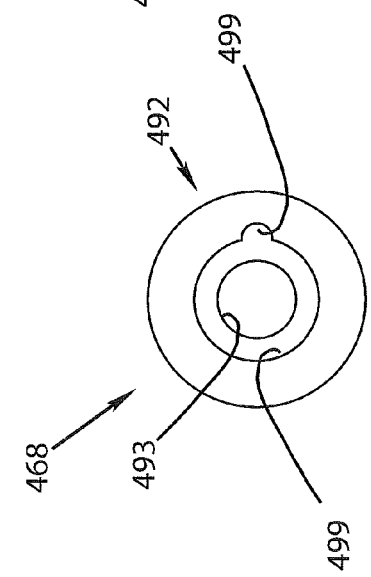

STRUCTURAL CONNECTION ALIGNING DEVICE

RELATED APPLICATION

The present invention is a divisional of U.S. patent application Ser. No. 11/935,630, filed Nov. 6, 2007 entitled "Structural Connection Aligning Device and Method of Use Thereof", now U.S. Patent No. 8,266,766, which is a continuation-in-part of co-pending U.S. patent application Ser. No. 11/036,848, filed Jan. 14, 2005 and entitled "Pipe Aligning Device and Method of Use Thereof" and which are all incorporated herein by reference.

BACKGROUND

1. Field of Technology

The present invention relates to a device for the alignment structural connections. In particular, the present invention relates to the device having particular features, and the method for its use, for aligning of pipes, fittings, rods, beams, sheets, angle-iron, flat-iron, I-beams, rounds and the like, so as to easily provide tack welds prior to welding.

2. Related Art

In the field of welding, efforts toward devices and methods to assist in aligning pipes, pipe elements and other connecting structures are continuously being made. Devices and methods have been developed to facilitate structural alignment for appropriate welding and connection. However, existing devices and methods are often bulky, user unfriendly, not capable of use with varying size structures, inaccurate, imprecise, and time and labor intensive.

Therefore a need exists for a device and method of use for the alignment of pipes, pipe elements, and other structures which overcomes at least one of the aforementioned deficiencies and others that provides a device and method for efficient, adjustable, easy, accurate, and precise alignment of pipes and pipe elements.

SUMMARY

One aspect of the present invention is a structural connection aligning device comprising:

an alignment head configured to be removably secured proximate an end of a first structural element;

an alignment element attached to the alignment head, the alignment element having a rotatably secured plunging body that extends from the alignment head and engages an end of a second structural element when the alignment head is removably secured proximate the end of the first structural element;

a cartridge fit into the alignment head operable with the plunging body such that neither the plunging body nor the cartridge can substantially rotate with respect to each other; and a securing member placed to interfere with the retractability of the cartridge after it has been appropriately fit into the alignment head.

A second aspect of the present invention is a structural connection aligning device comprising:

an alignment head;

at least one alignment element attached to the alignment head, the at least one alignment element having a plunging body extendable from the alignment head, wherein the plunging body includes a contact area contoured to match a curved outer surface shape of a structural element to be aligned by the aligning device;

a drive member, wherein the drive member contacts the plunging body to move the plunging body;

a cartridge fit into the alignment head operable with the plunging body such that neither the plunging body nor the cartridge can substantially rotate with respect to each other; and a securing member placed to interfere with the retractability of the cartridge after it has been appropriately fit into the alignment head.

BRIEF DESCRIPTION OF THE DRAWINGS

The features of the present invention will best be understood from a detailed description of the invention and an embodiment thereof selected for the purpose of illustration and shown in the accompanying drawing in which:

FIG. 4E depicts a perspective view of a third embodiment of the alignment element of the device, in accordance with the present invention;

FIG. 4F depicts a side perspective view of the third embodiment of the alignment element of the device, in accordance with the present invention;

FIG. 5 depicts a perspective view of an embodiment of a tack weld gap shim, in accordance with the present invention;

FIG. 9A depicts a vertical side view of an embodiment of a cartridge, in accordance with the present invention;

FIG. 9B depicts a side perspective view of an embodiment of a cartridge, in accordance with the present invention;

FIG. 9C depicts a bottom end view of an embodiment of a cartridge, in accordance with the present invention;

FIG. 9D depicts a horizontal side view of an embodiment of a cartridge, in accordance with the present invention;

FIG. 9E depicts a top end view of an embodiment of a cartridge, in accordance with the present invention

DETAILED DESCRIPTION

Figure 1:
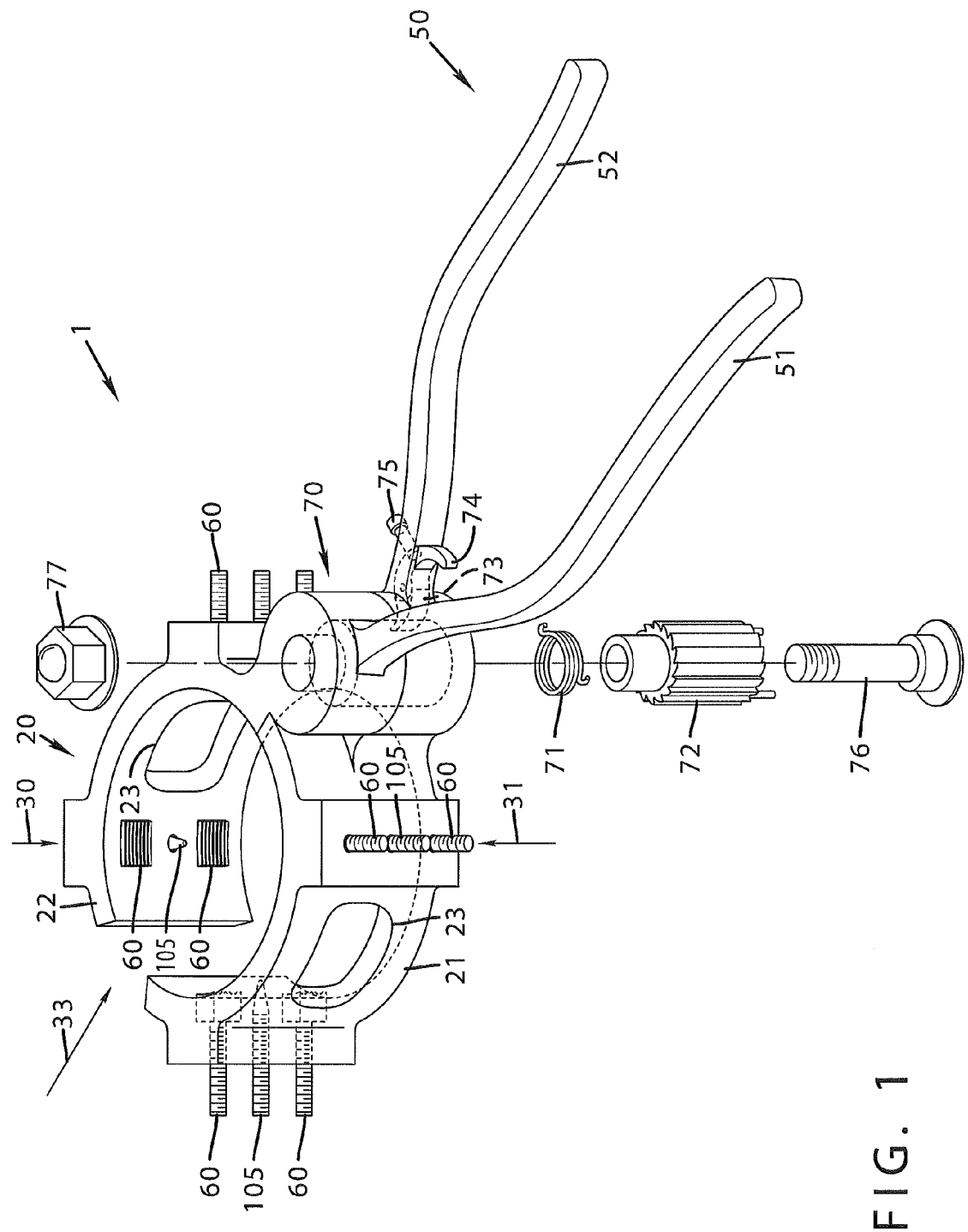
FIG. 1 depicts a perspective view of an embodiment of an aligning device, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc. . . . , and are disclosed simply as an example of an embodiment. The features and advantages of the present invention are illustrated in detail in the accompanying drawing, wherein like reference numeral refer to like elements throughout the drawings. Although the drawings are intended to illustrate the present invention, the drawings are not necessarily drawn to scale.

FIG. 1 depicts a perspective view of the device 1 for aligning pipe elements, in accordance with the present invention.

The device 1 comprises: an alignment head 20, alignment elements 60, a pressure mechanism 70, a handle 50, and a tack weld shim 105.

Figure 2A:
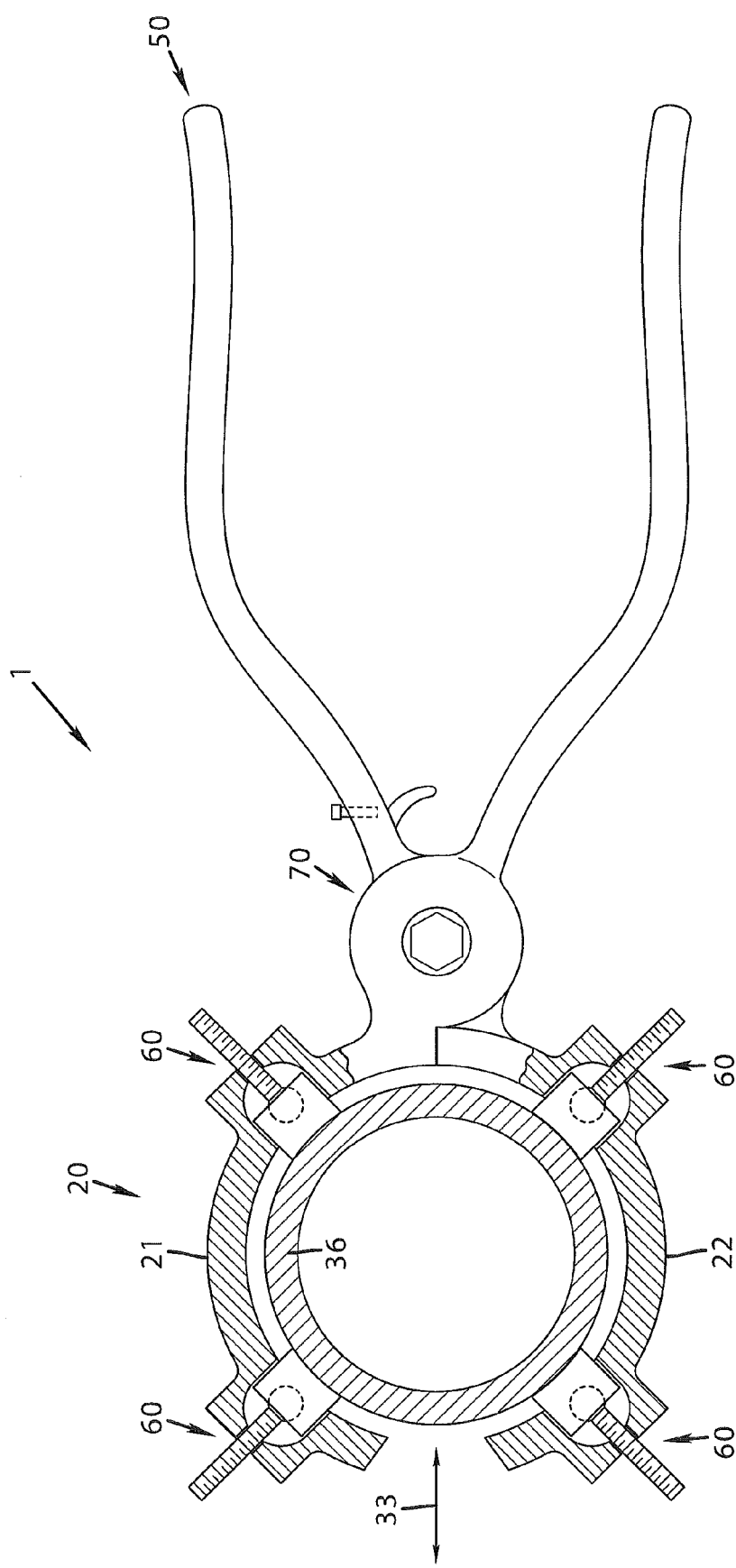
FIG. 2A depicts a side sectional view of an embodiment the aligning device, in a closed configuration, in accordance with the present invention.

FIG. 2A depicts a side view of the device 1, in a closed configuration, for aligning elements, in accordance with the present invention.

Figure 2B:
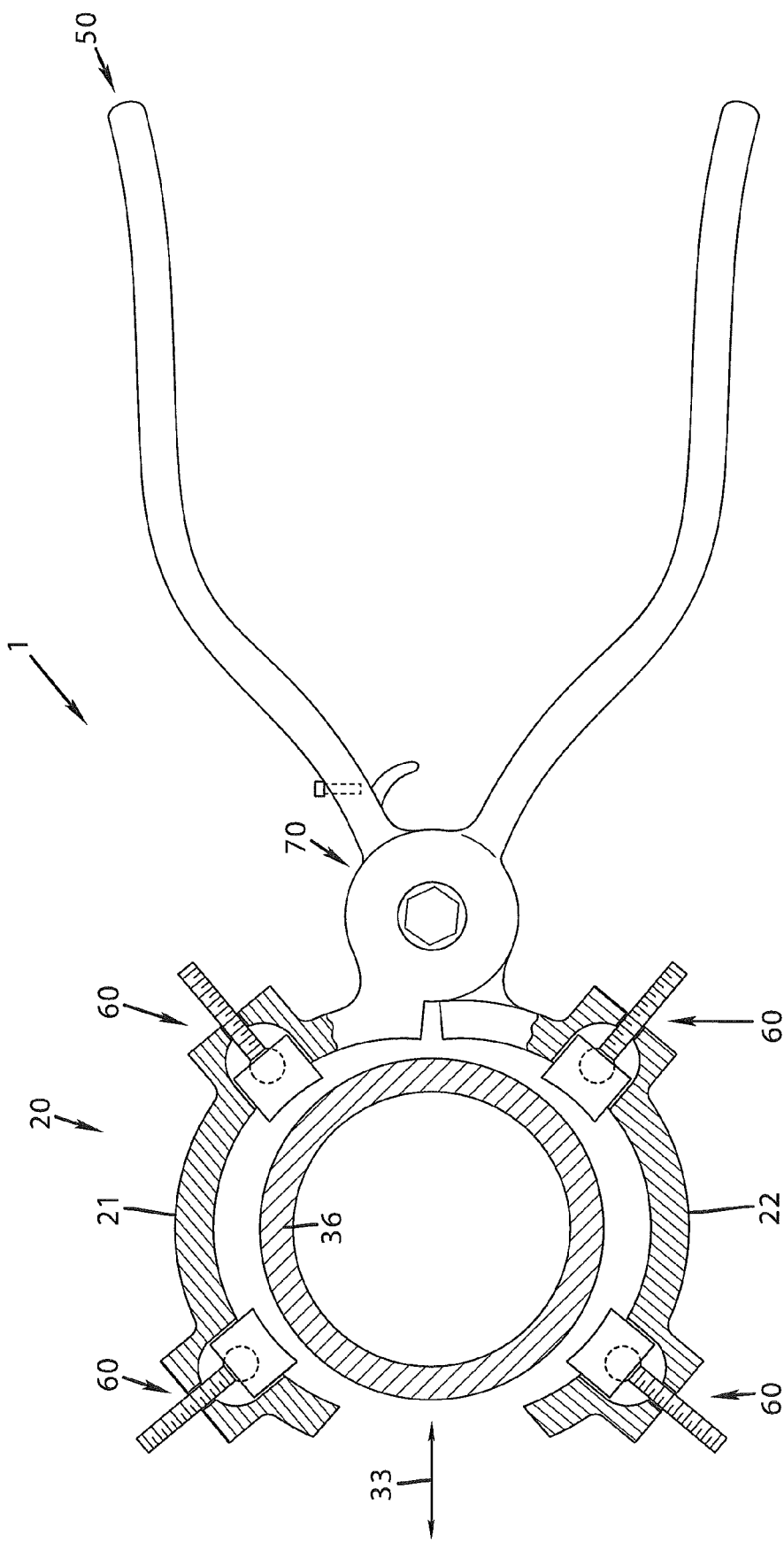
FIG. 2B depicts a side sectional view of an embodiment of the aligning device, in an open configuration, in accordance with the present invention.

FIG. 2B depicts a side view of the device 1, in an open configuration, for aligning elements, in accordance with the present invention.

Figure 3:
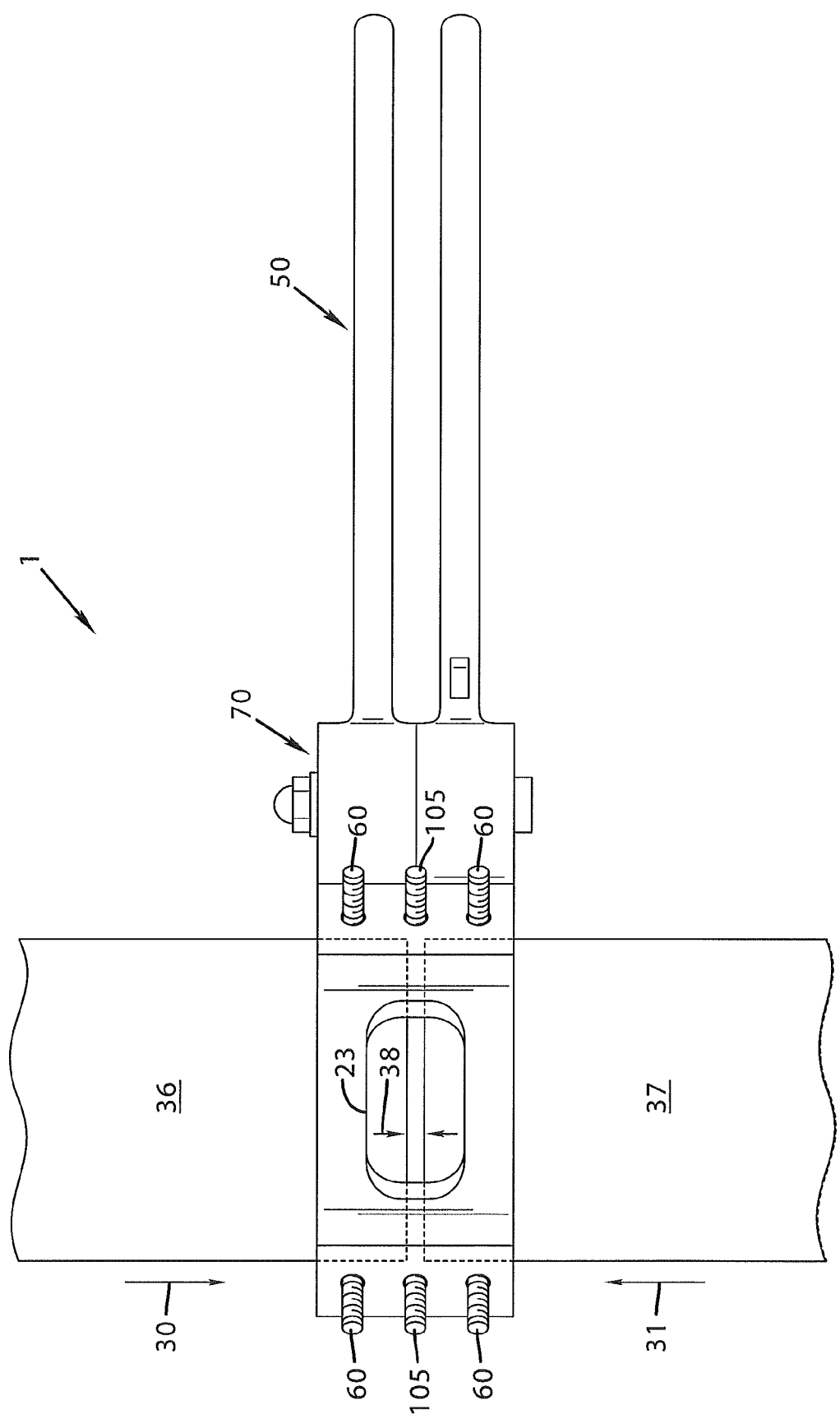
FIG. 3 depicts a top view of an embodiment of a portion of the aligning device, in accordance with the present invention.

FIG. 3 depicts a top view of the device 1 in use for aligning elements, in accordance with the present invention. Referring to FIGS. 1-3, the alignment head 20 further comprises: an upper jaw 21, a lower jaw 22, and work windows 23.

The jaws 21 and 22 are for holding a first element 36 and a second element 37 so as to allow the elements 36 and 37 to be tack welded together. This is accomplished via the jaws 21 and 22 surrounding the elements 36 and 37. Surrounding as used herein is defined as extending or partially extending on all sides of the first element 36 and the second element 37 simultaneously, i.e., encircle; enclosing or confining, or partially enclosing or partially confining on all sides so as to secure the elements 36 and 37 within the jaws 21 and 22; encompassing or partially encompassing the first element 36 and the second element 37; and combinations thereof.

The jaws 21 and 22 are typically constructed of materials including but not limited to steel, aluminum, iron, ceramic composites, polymer composites, nano-polymer composites, alloys of the aforementioned, and combinations thereof. The construction materials, as previously described, to form the jaws 21 and 22 are not meant to limit the scope of the materials that may be used in an embodiment of the present invention. Any tack weld resistant material as well as weld resistant material having physical and chemical properties to withstand temperatures and pressures typically generated under the aforementioned conditions can be used thereof in accordance with the device and method of the present invention.

Tack welding is the fastening or joining of two elements, via at least one tack weld, by applying heat, sometimes with pressure and sometimes with an intermediate or filler metal having a high melting point. A tack weld is a small scale weld, generally performed in a sequence, of two elements. A sequence of tack welds is used to hold, align, or steer segments of elements to be joined. Elements are defined as elbows, 90° elbows, 45° elbows, tees, reducers, flanges, straight pipe, tubing, hand-railing, boiler tube, square tube, bars, structural shapes, and combinations thereof.

Elements are typically constructed of materials including but not limited to steel, aluminum, copper, brass, iron, ceramic composites, polymer composites, nano-polymer composites, alloys of the aforementioned, and combinations thereof. The composition of the elements, as previously described, is not meant to limit the scope of the types of elements that may be used in an embodiment of the present invention. Any element composition having physical and chemical properties to withstand temperatures and pressures typically generated under welding and tack welding conditions can be used thereof in accordance with the device and method of the present invention.

In the open configuration (see FIG. 2B), the first element 36 may be inserted into the jaws 21 and 22 of the alignment head 20 along a directional arrow 30. The second element 37 then may be inserted into the jaws 21 and 22 along a directional arrow 31. Alternatively, the elements 36 and 37 may be inserted into the jaws along a directional arrow 33. Furthermore, the elements 36 and 37 may be inserted into the jaws 21 and 22 by any combination of the aforementioned methods.

In the closed configuration (see FIG. 1 & FIG. 2A), the upper jaw 21 and the lower jaw 22 typically do not meet together, i.e. do not fully surround the elements 36 and 37. However, the aforementioned configuration as previously described, is not meant to limit the configuration of the jaws 21 and 22 with the elements 36 and 37. The jaws 21 and 22 may fully surround the elements 36 and 37 as previously defined. The closed configuration is characterized by the jaws 21 and 22 locking the elements 36 and 37 within the jaws 21 and 22.

The work windows 23 have multiple uses. The windows 23 allow a user to visually align the elements 36 and 37 after they have been inserted into the jaws 21 and 22. The alignment of the elements 36 and 37 typically is performed with the device 1 in the closed configuration. The alignment of the elements 36 and 37 to each other will be locked in place whilst in the closed position. The windows 23 also allow the user to view the setting of a tack weld gap 38 between the elements 36 and 37. After aligning the first element 36 and second element 37 to user required specifications, the elements 36 and 37 can be tack welded together via welding through the work windows 23. The tack welding can be performed using any of the work windows 23. Typically, the alignment head 20 is comprised of one to four work windows.

The work windows 23 provide a visual confirmation that a chosen or specific tack weld gap 38 clearance between the elements 36 and 37 has been achieved, and also allows the user to quantitatively, i.e., measure the tack weld gap 38 and axial alignment using typical weld gap 38 and axial alignment measuring devices. The work windows 23 also allow the user to inscribe or mark into the elements 36 and 37, in the vicinity of the tack weld, any specifications of the tack weld or information that a user may wish to convey about the tack weld.

Figure 4A:
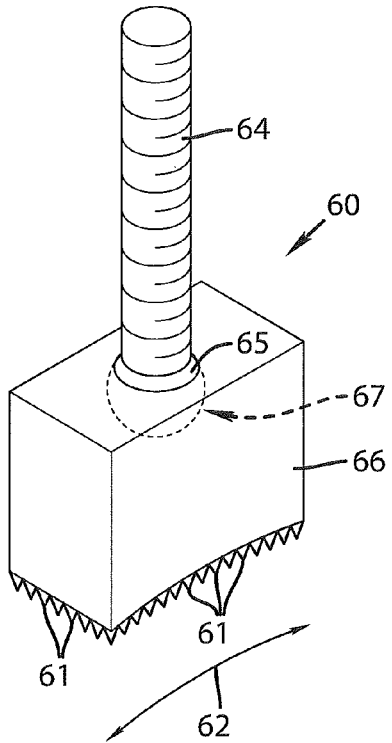
FIG. 4A depicts a perspective view of an embodiment of an alignment element of the device, in accordance with present invention.

FIG. 4A is a perspective view of an alignment element 60 of the device 1, in accordance with present invention.

Figure 4B:
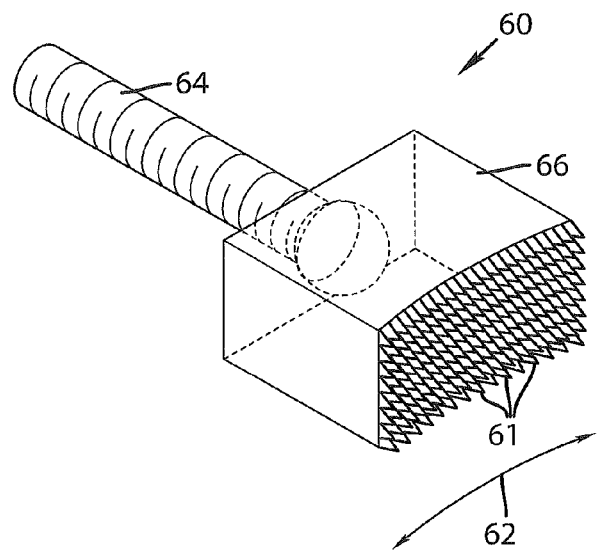
FIG. 4B depicts a side perspective view of an embodiment of the alignment element of the device of FIG. 4A, in accordance with the present invention.

FIG. 4B is a side perspective view of the alignment element 60 of the device 1, in accordance with the present invention.

Figure 4C:
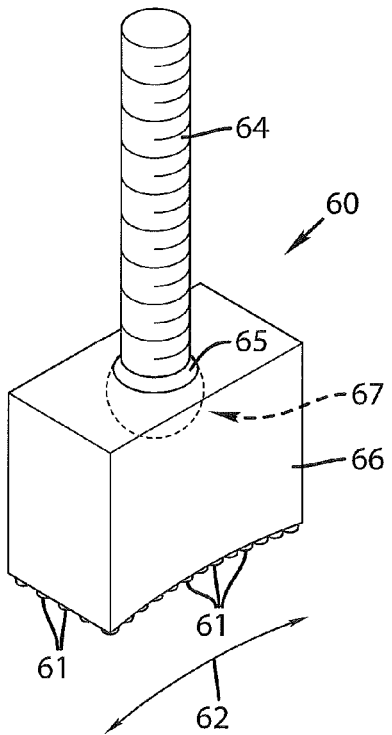
FIG. 4C depicts a perspective view of a second embodiment of an alignment element of the device, in accordance with the present invention.

FIG. 4C is a perspective view of a second embodiment of the alignment element 60 of the device 1, in accordance with the present invention.

Figure 4D:
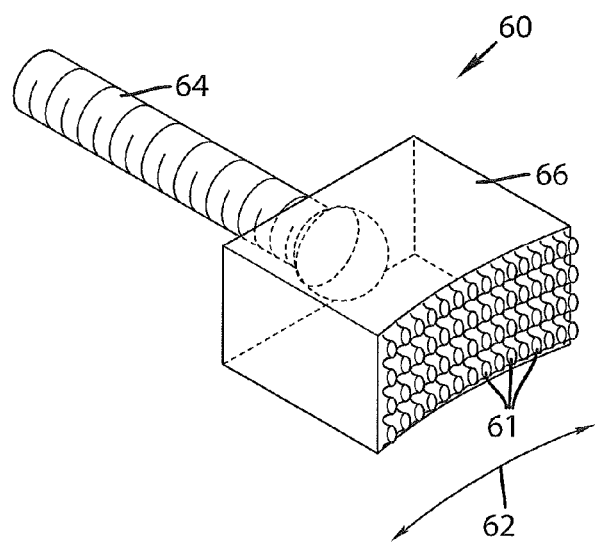
FIG. 4D depicts a side perspective view of the second embodiment of the alignment element of the device, in accordance with the present invention.

FIG. 4D is a side perspective view of a second embodiment of the alignment element 60 of the device 1, in accordance with the present invention.

FIG. 4E is a perspective view of a third embodiment of the alignment element 60 of the device 1, in accordance with the present invention.

FIG. 4F is a side perspective view of the third embodiment of the alignment element 60 of the device 1, in accordance with the present invention. Referring to FIGS. 1-4F; the alignment element 60 comprise an alignment element rod 64, a ball and socket joint 65, an alignment element body 66, an alignment element contact area 61, and a ball 67. The alignment element 60 is used to precisely and accurately axially align the elements 36 and 37 within the alignment head 20.

The alignment element body 66 is a shoe, pad, a physical body, device, and the like used to secure the first element 36 and the second element 37 within the alignment head 20. The alignment element contact area 61 is a distinguishable extent of the surface of the alignment element 60 which makes contact with the elements 36 and 37, and secures the elements 36 and 37 within the jaws 21 and 22. The area 61 may be a surface comprising of teeth, pads, irregular projections, regular projections, grooved recesses, micro-teeth, micro-pads, micro-projections, and the like. The area 61 further may have coatings of the aforementioned on the area 61. The contact area 61 is generally arcuate shaped, as indicated by arrow 62.

The alignment element rod 64 is used to control movement of the alignment element body 66. The element rod 64 is operably connected to the ball 67 which fits into the ball and socket joint 65 of the element body 66. Adjustment of the element rod 64 in one direction, for example turning of the element rod 64 clockwise, results in the element body 66 moving towards the elements 36 and/or 37. As the element rod 64 is further adjusted, the element body 66 eventually will contact the elements 36 and/or 37 resulting in the axial movement of the elements 36 and/or 37.

Adjustment of the element rod 64 in the opposite direction, for example turning of the element rod 64 counter-clockwise, results in the element body 66 moving away from the elements 36 and/or 37. As the element rod 64 is further adjusted, the element body 66 eventually will lose contact with the elements 36 and/or 37. The alignment body 66 has a range of movement from about +¼ inch to about −¼ of an inch.

Typically, the alignment elements 60 are evenly spaced around the alignment head 20 thus allowing for adjustment of the elements 36 and 37 in two axis. Adjustment of the elements 36 and 37 along the third axis is performed by hand. The device 1, via the alignment elements 60, is able to axially aligning the elements 36 and 37 in along three different axis.

The connection with the ball 67 of the alignment element rod 64 and, the ball and socket joint 65 may be permanent, i.e. an integral attachment, or removably attachable with the joint 65 thus allowing varying size alignment elements 60 to be used with the device 1. Furthermore, the alignment element 60 may be integrally attached to the alignment head 20 or it may be non-integrally attached to the alignment head via a wing nut, a square nut, flanges, clips, and the like.

The alignment element 60 is constructed of materials including but not limited to steel, aluminum, iron, copper, brass, ceramic composites, polymer composites, nano-polymer composites, alloys of the aforementioned, and combinations thereof. The construction materials, as previously described, to form the element 60 are not meant to limit the scope of the materials that may be used in an embodiment of the present invention. Any tack weld resistant material having physical and chemical properties to withstand temperatures and pressures typically generated under tack welding conditions can be used to form the alignment element 60 thereof in accordance with the device and method of the present invention.

Referring to FIGS. 1-3, a pressure mechanism 70 of the device 1, in accordance with the present invention, may comprise: a torsion spring 71, a ratchet 72, a pawl 73, a trigger release 74, a tension control pin 75, a bolt 76, and a nut 77. The pressure mechanism 70 allows the user to provide a selectable pressure to the jaws 21, 22 and the pipe elements 36 and 37 held therein. Typically the pressure selected lies in a range from about 0 Pounds per Square Inch (PSI) to about 2,500 PSI. Further, the design is such that the pressure mechanism 70 can readily be released so as to remove all pressure from the pipe elements and/or to adjust the pressure applied to a different (i.e., greater or less) pressure.

The mechanism 70 includes a torsion spring mechanism which consists of a torsion spring 71 for creating tension to the pawl 73 that engages the teeth of the ratchet 72, permitting motion in one direction with a quick release for motion in the opposite direction. Furthermore, the mechanism 70 allows for pressure to be created and directed outwardly to the user's hand via the handles 51 and 52. This provides for a greater feel for and ease in handling the device 1 during axial alignment of the elements 37 and 37 as well as during tack welding.

The pressure mechanism 70, as previously described, is not meant to limit the scope of pressure mechanism that may be used in an embodiment of the present invention.

Alternative examples of pressure mechanisms that can be use thereof include but are not limited to any type of pawl and ratchet mechanism, and the like. Any pressure mechanism that can produce pressures used to align and secure pipe elements during tack welding conditions can be used thereof in accordance with the device and method of the present invention.

Referring to FIGS. 1, 2A, and 2B the handle 50 comprises: an upper arm 51 and a lower arm 52. The upper arm 51 is connected to the lower jaw 22 and the lower arm 52 is connected to the upper jaw 21. The arms 51 and 52 are so designed such as to allow a user to hold the device 1 with one hand and to selectively apply pressure, via the pressure mechanism 70, while manipulating the elements 36 and 37 with the other hand as well as performing tack welding and related tasks to the elements 36 and 37. Typically the handle 50 is from about 6 inches to about 9 inches in length. This distance may or may not include the pressure mechanism 70 in the final measurement.

Typically, the alignment head 20, the pressure mechanism 70, and the handle 50 of the device 1 are configured as one piece and not removably attachable from one another. The aforementioned configuration, as previously described, is not meant to limit the scope of the present invention. Alternatively, it can be envisioned where the alignment heads are of differing sizes such as ¼", ½", ¾", 1", 1¼" . . . up to 8" outer diameter (O.D.) may be reversibly attachable from the handle 50 and/or the pressure mechanism 70. The characteristic of having an alignment head 20 that is reversibly attachable allows for the use of the one handle 50 and one pressure mechanism 70 with a wide variety of different sized alignment heads for aligning and tack welding elements 36 and 37 of varying sizes.

Typically, an area on the pressure mechanism 70 between the mechanism 70 and the jaws 21 and 22 exists where the alignment head 20 is removably attached to or from the mechanism 70. The means of removable attachment include but are not limited to a hinge, a snap-fit bolt and lock, a screw-in bolt and lock, a sliding bolt and lock, and combinations thereof.

Alternatively, the area for removable attachment of the alignment head 20 may exist between the pressure mechanism 70 and the handle 50. The pressure mechanism 70 is may be integrally attached to the alignment head 20. Thus, the alignment head 20 having the pressure mechanism 70 integrally attached to the head 20 can be removably attached to the handle 50. The means of removable attachment include but are not limited to a hinge, a snap-fit bolt and lock, a screw-in bolt and lock, a sliding bolt and lock, and combinations thereof.

FIG. 5 is a perspective view of the tack weld shim 105 of the device 1, in accordance with the present invention. Referring to FIGS. 1, 3 and 5, the tack weld shim 105 comprises: a shim end 106, a shaft 107, and an adjustment head 108. The tack shim 105 is used to set the tack weld gap 38 between elements. The adjustment head 108 is used to lower or to raise the entire tack shim 105. Typically this is accomplished via turning of the head 108 clockwise or counter-clockwise causing movement of the tack shim 105 toward or away from the tack shim 105. Alternatively, the head 108 may be pushed or pulled to cause movement of the tack shim 105. The methods of adjusting the tack shim 105, as previously described, are not meant to limit the scope of the methods that may be used in an embodiment of the present invention. Any method or device that allows for controlled movement of the tack shim 105 required under tack welding conditions or pre-tack weld conditions can be used thereof in accordance with the device and method of the present invention.

The shaft 107 extends through the alignment head 20 and typically is threaded to allow a twisting or rotating motion as described above. Alternatively though, the shaft may be configured in any way such as to allow movement of the shim 105 within the alignment head 20 and within the tack weld gap 38. For example, the shaft 107 may be notched, graduated, demarcated, and the like to allow controlled movement of the shim 105 into the tack weld gap 38.

The shim end 106 is the portion of the tack shim 105 that extends into the tack weld gap 38. The end 106 is typically tapered to allow easy removal of the shim 105 from the weld gap 38 after tack welding has be performed. The end 106 also may be coated with materials including but not limited to ceramics, nano-composites, polymer composites, nano-polymer composites, alloys of the aforementioned, and combinations thereof to further enhance the ease of removal of the tack shim 105 from the weld gap 38 after tack welding has been performed.

The end 106 typically is conical in shape but may be cylindrical, trapezoidal, frustro-conical, and combinations thereof. Any shape of the end 106 that can provide and maintain a pre-selected tack weld gap 38 between elements under tack welding conditions or pre-tack weld conditions used as well as allowing for ease of removal from the tack weld gap 38 after tack welding can be used thereof in accordance with the device and method of the present invention.

Referring to FIGS. 1-5, in use of the device 1 in accordance with the present invention, a user adjusts the device 1 having an integrated alignment head 20 to an open configuration (see FIG. 2B) by releasing the pressure mechanism 70. In this example the pressure mechanism 70 is a torsion spring mechanism, and the elements 36 and 37 are straight pipes and shall be referred herein as pipes 36 and 37. The jaws 21 and 22 are opened to provide a clearance wide enough for the pipes 36 and 37 to be inserted or slipped into the jaws 21 and 22 along the directional arrows 30 and 31 respectively or along the directional arrow 33. Anytime during the insertion step, the alignment elements 60 can be adjusted, using the alignment element rod 64, also to allow maximum clearance for insertion of the straight pipes 36 and 37.

The pipes 36 and 37 then are inserted until the edges of the pipes 36 and 37 are in the vicinity of each other and can be viewed in the tack weld window 33. Pressure is applied to the pipes 36 and 37 via the pressure mechanism 70 to loosely secure the pipes 36 and 37 within the jaws 21 and 22, and more specifically via the alignment element bodies 66 of the alignment elements 60. The alignment element rods 64 are then adjusted to further apply pressure to the pipes 36 and 37; to secure the pipes 36 and 37 within the alignment head 20; and to axially align the pipes 36 and 37.

The method of applying pressure, securing, and axially aligning the straight pipes 36 and 37 is an iterative one. The method is repeated as many times as necessary to accurately and precisely align the pipes 36 and 37 with each other for tack welding and other welding tasks. Furthermore, applying pressure, securing, and axially aligning the pipes 36 and 37 can be done in any order or in any combination. For example, a user can first secure the pipes 36 and 37 using the alignment elements 60 before using the pressure mechanism 70 to lock the pipe elements 36 and 37 in place.

Having accurately and precisely aligned the straight pipes 36 and 37, the tack weld gap 38 typically then is set using the tack weld gap shim 105. The tack weld shim end 106 of the tack shim 105 is inserted between the straight pipes 36 and 37 via the adjustment head 108. In this example, the tack shim 106 comprises a threaded shaft 107 and a conical end 106 that is demarcated. The head 108 is turned or rotated in a clockwise direction causing the shim 105 and more specifically the conical end 106 to move towards/into the tack weld gap 38. In this example, each demarcation is equivalent to 4 mm of space between the pipe elements 36 and 37. Inserting the end 106 of the tack shim 105 to the $4^{th}$ demarcation is equivalent to setting the tack weld gap 38 to 16 mm.

Alternatively, each demarcation could be equivalent to 1 mm, 2 mm, 3 mm or any unit of distance typically used for tack weld gaps 38 and tack welding conditions. The tack weld gap 38 can be set from about ⅛ inch to about ⅕ inch. After having set the tack weld gap 38, the user then may tack weld the pipe elements 36 and 37 knowing that the straight pipes 36 and 37 have been accurately and precisely aligned and the tack weld gap 38 set per the user's requirement. The device 1 containing the pipes 36 and 37, axially aligned and having a chosen tack weld gap 38, is held in one hand while the other hand is used to hold and operate a welding torch for subsequent tack welding.

After tack welding is completed, the user removes the tack weld shims 105 from the tack weld gap 38. The configuration of the shim end 106 is conducive for easy removal. The pipes 36 and 37 exert significant pressure on the shim end 106 due to cooling of the tack weld and a resultant contraction of the tack weld. The conical shape of the shim end 106 allows the user to easily remove the tack weld shim 105 from the shim gap 38. Any tack weld shim 105 having concial, cylindrical, trapezoidal, frustro-conical, and combinations thereof or having coatings with materials including but not limited to ceramics, nano-composites, polymer composites, nano-polymer composites, alloys of the aforementioned can be used thereof in accordance with the device and method of the present invention.

Typically, a user may axially align and tack weld elements having a particular diameter with the alignment device 1 appropriately sized to work with the aforementioned pipes. Alternatively, a user may axially align and tack weld elements using an aligning device having a non-integrally attached alignment head, i.e., a reversibly attachable head for surrounding, securing, and axially aligning the elements.

In use of an aligning device having a reversibly attachable head, a user assembles the device by first attaching the upper jaw and the lower jaw of the alignment head to an area on the pressure mechanism between the mechanism and the alignment head. The means of removable attachment include but are not limited to a hinge, a snap-fit bolt and lock, a screw-in bolt and lock, a sliding bolt and lock, and combinations thereof. After the alignment head has been securely attached to the pressure mechanism, the device is ready to use for aligning pipe elements as described in the aforementioned example.

Alternatively, the area for removable attachment of the alignment head may exist between the pressure mechanism and the handle. The pressure mechanism is typically integrally attached to the alignment head under this example but necessarily so. Thus, the alignment head having the pressure mechanism integrally attached to the head can be removably attached to the handle. The means of removable attachment include but are not limited to a hinge, a snap-fit bolt and lock, a screw-in bolt and lock, a sliding bolt and lock, and combinations thereof.

In this example the pressure mechanism is a torsion spring mechanism, and the pipe elements are straight pipes. The jaws and are opened to provide a clearance wide enough for the straight pipes to be inserted or slipped into the jaws. Anytime during the insertion step, the alignment elements can be adjusted, using the alignment element rod, also to allow maximum clearance for insertion of the straight pipes.

The straight pipes then are inserted until the ends of the pipes are in the vicinity of each other and can be viewed in the tack weld window. Pressure is applied to the pipes via the pressure mechanism to loosely secure the pipes within the jaws, and more specifically via the alignment element bodies of the alignment elements. The alignment element rods are then adjusted to further apply pressure to the pipes; to secure the pipes within the alignment head; and to axially align the pipes.

The method of applying pressure, securing, and axially aligning the straight pipes is an iterative one. The method is repeated as many times as necessary to accurately and precisely align the pipes with each other for tack welding and other welding tasks. Furthermore, applying pressure, securing, and axially aligning the pipes can be done in any order or in any combination. For example, a user can first secure the pipes using the alignment elements before using the pressure mechanism to lock the pipe elements in place.

Having accurately and precisely aligned the straight pipes, the tack weld gap typically then is set using the tack weld gap shim. The tack weld shim end of the tack shim is inserted between the straight pipes via the adjustment head. In this example, the tack shim comprises a threaded shaft and a conical end that is demarcated. The head is turned or rotated in a clockwise direction causing the shim and more specifically the conical end to move towards/into the tack weld gap. In this example, each demarcation is equivalent to 4 mm of space between the pipe elements. Inserting the shim end of the tack shim to the $4^{th}$ demarcation is equivalent to setting the tack weld gap to 16 mm.

Alternatively, each demarcation could be equivalent to 1 mm, 2 mm, 3 mm or any unit of distance typically used for tack weld gaps and tack welding conditions. The tack weld gap can be set from about ⅛ inch to about ½ inch. After having set the tack weld gap, the user then may tack weld the pipe elements knowing that the straight pipes have been accurately and precisely aligned and the tack weld gap set per the user's requirement. The device containing the pipes, axially aligned and having a chosen tack weld gap, is held in one hand while the other hand is used to hold and operate a welding torch for subsequent tack welding.

After tack welding is completed, the user removes the tack weld shims from the tack weld gap. The configuration of the shim end is conducive for easy removal. The straight pipes exert significant pressure on the shim end due to cooling of the tack weld and a resultant contraction of the tack weld. The conical shape of the shim end allows the user to easily remove the tack weld shim from the shim gap. Any tack weld shim end having concial, cylindrical, trapezoidal, frustro-conical, and combinations thereof or having coatings with materials including but not limited to ceramics, nano-composites, polymer composites, nano-polymer composites, alloys of the aforementioned can be used thereof in accordance with the device and method of the present invention. The user then may disassemble the device by removing the alignment head from the area on the pressure mechanism in which the alignment head was attached.

Alternatively, a user may axially align and tack weld elements using an aligning device 1 having non-integrally attached alignment elements 60, i.e., reversibly attachable alignment elements 60 for securing and axially aligning pipe elements. Referring to FIGS. 1-5, in use of the device 1 in accordance with the present invention, a user attaches the reversibly attachable alignment elements 60 to the alignment head 20 of the device 1. The alignment elements 60 may be secured to the alignment head 20 via a wing nut, a square nut, flanges, clips, and the like.

The user then adjusts the device 1 with the alignment elements 60 attached to the alignment head 20 to an open configuration (see FIG. 2B) by releasing the pressure mechanism 70. In this example the pressure mechanism 70 is a torsion spring mechanism, and the pipe elements 36 and 37 are straight pipes.

The jaws 21 and 22 are opened to provide a clearance wide enough for the straight pipes 36 and 37 to be inserted or slipped into the jaws 21 and 22 along the directional arrows 30 and 31 respectively or along the directional arrow 33. Anytime during the insertion step, the alignment elements 60 can be adjusted, using the alignment element rod 64, also to allow maximum clearance for insertion of the straight pipes 36 and 37.

The straight pipes 36 and 37 then are inserted until the edges of the pipes 36 and 37 are in the vicinity of each other and can be viewed in the tack weld window 33. Pressure is applied to the pipes 36 and 37 via the pressure mechanism 70 to loosely secure the pipes 36 and 37 within the jaws 21 and 22, and more specifically via the alignment element bodies 66 of the alignment elements 60. The alignment element rods 64 are then adjusted to further apply pressure to the pipes 36 and 37; to secure the pipes 36 and 37 within the alignment head 20; and to axially align the pipes 36 and 37.

The method of applying pressure, securing, and axially aligning the straight pipes 36 and 37 is an iterative one. The method is repeated as many times as necessary to accurately and precisely align the pipes 36 and 37 with each other for tack welding and other welding tasks. Furthermore, applying pressure, securing, and axially aligning the pipes 36 and 37 can be done in any order or in any combination. For example, a user can first secure the pipes 36 and 37 using the alignment elements 60 before using the pressure mechanism 70 to lock the pipe elements 36 and 37 in place.

Having accurately and precisely aligned the straight pipes 36 and 37, the tack weld gap 38 typically then is set using the tack weld gap shim 105. The tack weld shim end 106 of the tack shim 105 is inserted between the straight pipes 36 and 37 via the adjustment head 108. In this example, the tack shim 106 comprises a threaded shaft 107 and a conical end 106 that is demarcated. The head 108 is turned or rotated in a clockwise direction causing the shim 105 and more specifically the conical end 106 to move towards/into the tack weld gap 38. In this example, each demarcation is equivalent to 4 mm of space between the pipe elements 36 and 37. Inserting the end 106 of the tack shim 105 to the $4^{th}$ demarcation is equivalent to setting the tack weld gap 38 to 16 mm.

Alternatively, each demarcation could be equivalent to 1 mm, 2 mm, 3 mm or any unit of distance typically used for tack weld gaps 38 and tack welding conditions. The tack weld gap 38 can be set from about ⅛ inch to about ½ inch. After having set the tack weld gap 38, the user then may tack weld the pipe elements 36 and 37 knowing that the straight pipes 36 and 37 have been accurately and precisely aligned and the tack weld gap 38 set per the user's requirement. The device 1 containing the pipes 36 and 37, axially aligned and having a chosen tack weld gap 38, is held in one hand while the other hand is used to hold and operate a welding torch for subsequent tack welding.

After tack welding is completed, the user removes the tack weld shims 105 from the tack weld gap 38. The configuration of the shim end 106 is conducive for easy removal. The straight pipes 36 and 37 exert significant pressure on the shim end 106 due to cooling of the tack weld and a resultant contraction of the tack weld. The conical shape of the shim end 106 allows the user to easily remove the tack weld shim 105 from the shim gap 38. Any tack weld shim 105 having concial, cylindrical, trapezoidal, frustro-conical, and combinations thereof or having coatings with materials including but not limited to ceramics, nano-composites, polymer composites, nano-polymer composites, alloys of the aforementioned can be used thereof in accordance with the device and method of the present invention. The user then may disassemble the device 1 by removing the alignment elements 60 from the alignment head 20.

As depicted clearly in the drawings, an aligning device 1 includes an alignment head 20 (see FIGS. 1-3). The alignment head 20 is configured to be removably secured (see, for example, FIG. 2A) proximate an end of a first structural element, such as element 36 (see FIGS. 2A-3), to be aligned and connected. For example, embodiments of the device 1 may be secured onto the pipe element 36, inter alia, by a user through squeezing the handle 50, as optionally facilitated by a pressure mechanism 70, so that portions of the device 1 securely engage the structural pipe element 36. A user may remove the head 20 from its secured position on the structural pipe element 36, by unsqueezing or otherwise disengaging the handle 50 and/or pressure mechanism 70. Moreover, the aligning device 1 includes at least one alignment element 60 attached to the alignment head 20. The at least one alignment element 60 has a plunging body 66 (see FIGS. 1-2B and 4A-4F). Additionally, the plunging alignment element body 66 is extendable from the alignment head 20 to non-rotatably engage an end of a second structural element, such as element 37, to be aligned and connected (see FIGS. 1-3). The plunging body 66 is rotatably secured because of its shape. As clearly shown, the generally polygonal shape of the plunging alignment element body 66 prevents the body 66 from rotating as it operably plunges with respect to the alignment head 20 (see FIG. 1, which shows the rectangular ends of the plunging bodies 66 of the alignment elements 60 as partially protruding from the alignment head 20; see also the cross-sectional views of FIGS. 2A-B, which depict no gap or space between the plunging alignment element body 66 and the alignment head 20, therefore physically prohibiting rotational movement thereof).

In addition, embodiments of an aligning device 1 include a drive member, such as element rod 64 (see FIGS. 1-4F), wherein the drive member rod 64 contacts the plunging alignment element body 66 to move the plunging body 66 without rotating the plunging body 66. The plunging body 66 is rotationally fixed with relation to the alignment head 20. As depicted in FIGS. 2A-B and in relation to FIGS. 4A-4F, the drive member rod 64 includes an integral ball 67 at one end that operates with a ball socket 65 of the plunging alignment element body 66. The drive member rod 64 may be threaded, and thus may threadably operate with an alignment element 60 of an alignment head 20. Accordingly, as the drive member rod 64 is threadably rotated it may advance with respect to the alignment head 20. However, during threaded advancement, the ball 67 of the drive member rod 64 merely twists or rotates inside the ball socket 65 of the plunging alignment element body 66. Therefore, the advancing drive member rod 64 may operate on the plunging alignment element body 66 to push, plunge, or otherwise advance the plunging body 66 with respect to the alignment head 20, without transferring substantial rotation forces to the plunging body 66. The polygonal shape of the plunging body also prevents rotation. Consequently, the plunging body 66 may non-rotatably engage a structural element, such as element 36 and/or 37, to be aligned and connected. Non-rotatable contact between the plunging alignment element body 66 and the structural element 36 and/or 37 to be aligned or connected is advantageous because alignment movements of the various elements 36, 37 as worked upon by the aligning device 1, may be more precisely controlled and predicted. Rotational contact is undesirable because it may tend to skew orientation of the elements 36, 37 as the elements 36, 37 are aligned.

Known aligning devices of the prior art provide ball bearings or other implements that allow plunging members to rotate separately from driving members. However, standard aligning devices do not prevent plunging members from rotating. Thus, prior art aligning devices suffer because under a load the typical rotationally separate plunging members lock up with the corresponding drive members or otherwise become physically engaged rotationally with the with the drive members. Hence, the typical plunging members rotate with the drive member when under a load while in contact with a structural element to be aligned, thereby distorting the desired orientation of a structural element by transferring undesirable rotational force to the structural element. In contrast to the known art, embodiments of an aligning device 1 prevent rotation of the plunging member as it is driven and facilitate advantageous non-rotational contact between plunging bodies 66 of the device 1 and the elements 36, 37 to be aligned and connected.

Figure 6:
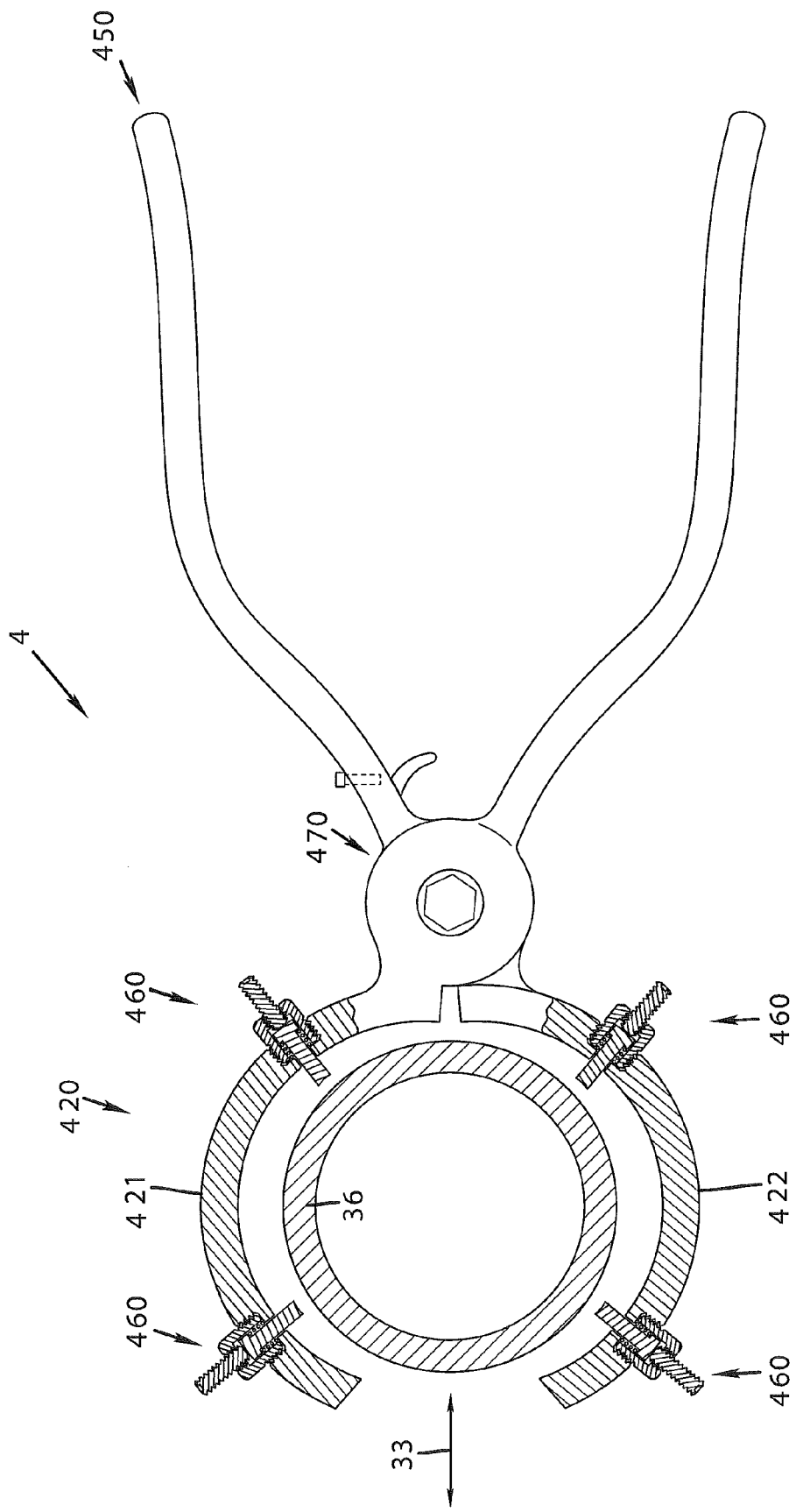
FIG. 6 depicts a side sectional view of another embodiment of an aligning device, in an open configuration, in accordance with the present invention.

With reference to FIG. 6, an embodiment of a structural connection aligning device 4 is depicted. The structural connection aligning device 4 may include an alignment head 420 configured to receive an end of a structural element, such as a first pipe 36, and an end of a structural element, such as a second pipe 37 (shown in FIG. 3). Moreover, the structural connection aligning device 4 may include an alignment element 460 attached to the alignment head 420. The aligning device 4 may include a plurality of alignment elements 460 attached to the alignment head 420. Still further, the alignment head 420 may be removably attached to a handle 450 and/or a pressure mechanism 470. As depicted, the pressure mechanism is located proximate the alignment head 20. However, those in the art should appreciate that the pressure mechanism 470 may be located anywhere along handle 450, in order to obtain a desired amount of mechanical advantage. Similarly the pressure mechanism 70 of aligning device 1, shown in FIGS. 1-3, may also be located anywhere along handle 50 to achieve a desired mechanical advantage.

The alignment head 420 may be configured to be removably positioned proximate the structural elements 36 and/or 37. For example, the alignment head 420 may be configured to at least partially encircle a structural element such as a pipe 36, 37. Additionally, the handle 450 may operate to move the head 420 to at least partially encircle the pipe element 36 and/or 37 and the head 420 may be configured to open or close as the handle 450 is squeezed closed or spread open. The alignment head 420 may further include an upper jaw 421 and a lower jaw 422. The jaws 421 and 422 may assist in holding a first pipe element 36 and a second pipe element 37 so as to allow the pipe elements 36 and 37 to be tack welded together. This is accomplished via the jaws 421 and 422 at least partially surrounding the pipe elements 36 and 37. The upper jaw 421 and the lower jaw 422 may not touch or meet together, i.e. the jaws 421, 422 may not fully surround the structural elements 36 and 37. However, the jaws 421 and 422 may fully surround the pipe elements 36 and 37 when the jaws 421 and 422 are located in a closed position. Hence, the head may be removably, but securely positioned proximate the ends of the structural pipe elements 36 and/or 37.

A structural connection aligning device 4 may include work windows, such as work windows 23 shown in FIGS. 1 and 3. The work windows may be operable with the head 420 and may have multiple uses. The windows 23 allow a user to visually align the structural elements 36 and 37 after they have been inserted into the jaws 421 and 422. The alignment of the structural elements 36 and 37 typically is performed with the structural connection aligning device 4 in a closed configuration (similar to the closed position of aligning device 1 shown in FIG. 2A). The windows 23 also allow a user to view the setting of a tack weld gap 38 between the structural pipe elements 36 and 37. After aligning the first pipe element 36 and second pipe element 37, the pipe elements 36 and 37 can be tack welded together via welding through the work windows 23. The tack welding can be performed using any of the work windows 23. Typically, the alignment head 420 includes one to four work windows.

Figure 7A:
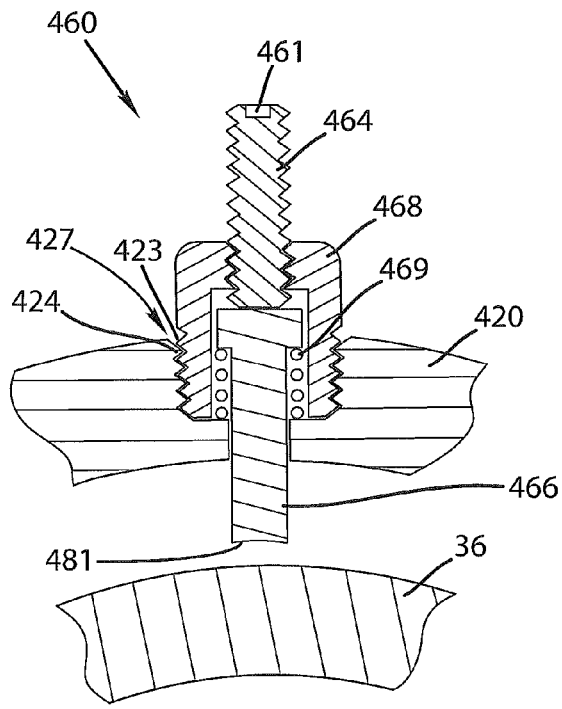
FIG. 7A depicts a blown-up partial sectional view of an embodiment of an alignment element operable with an embodiment of a head to engage a structural element to be aligned, in accordance with the present invention.

Referring further to the drawings, FIG. 7A depicts a blown-up partial sectional view of an embodiment of an alignment element 460 operable with an embodiment of an alignment head 420 to engage a structural element 36. The alignment element 460 includes a plunging body 466, a cartridge 468, and a drive member 464. The plunging body 466 is at least partially housed by and axially movable within the cartridge 468. The drive member 464 contacts the plunging body 466 to move the plunging body 466. In addition, the plunging body 466 may be extendable from the alignment head 420 to non-rotatably engage the pipe element 36 when the alignment head 420 is at least partially encircled about the pipe element 36. The plunging body 466 is rotatably secured and can not rotate. The drive member 466 of the alignment element 460 may be operable with the cartridge 468, such that the drive member 464 may contact the plunging body 466 to move, plunge, advance or otherwise extend the plunging body 466 without transferring significant rotational force to the plunging body 466.

The alignment element 460 may further comprise a spring 469 contacting the plunging body 466 and operable to exert a force against the plunging body 466 causing the plunging body 466 to remain in contact with the drive member 464. The spring 469 also contacts the alignment head 420, the spring 469 being positioned between the plunging body 466 and the alignment head 420. In such a position, the spring 469 may act to keep the plunging body 466 in contact with the drive member 464. Moreover, contact between the plunging body 466 and the drive member 464 is at least partially facilitated by the positioning of the spring 469 between the plunging body 466 and the head 420 to exert force upon the plunging body 466 in a direction toward the drive member 464.

The cartridge 468 may be removably attached to the head 420. As such the cartridge 468 may include exterior threads 423 configured to threadably mate with internal threads 424 of a hole 427 corresponding an alignment element 460 mounting location of the alignment head 420. The hole 427 may not extend all the way through the head 420 and accordingly may have a bottom floor to which the cartridge may abut when fully threaded into the hole 427. However, it should be recognized that the hole 427 may extend completely through a jaw 421, 422 of the alignment head 420.

Figure 7B:
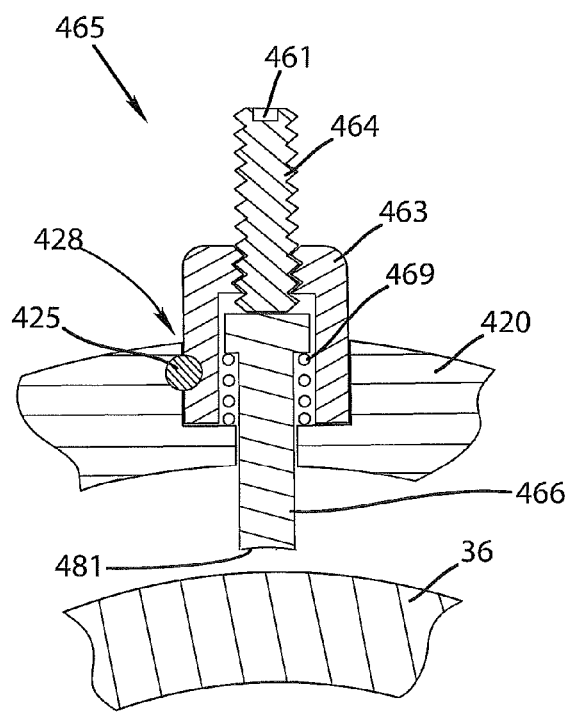
FIG. 7B depicts a blown-up partial sectional view of another embodiment of an alignment element operable with an embodiment of a head to engage a structural element to be aligned, in accordance with the present invention.

Referring further to the drawings, FIG. 7B depicts a blown-up partial sectional view of another embodiment of an alignment element 465. The alignment element 465 may be configured to be pressed to fit into a hole 428 of an alignment head 420. The hole 428 may have substantially smooth edges that may be fashioned for a tight tolerance fit with corresponding smooth outer edges of an embodiment of a cartridge 463. Accordingly, the alignment element 465 may be press fit into position on the alignment head 420. To securely retain the alignment element 465 in appropriate position a pin or other securing member 425 may be placed to interfere with the possible retractability of the cartridge 463 after it has been appropriately press fit into the hole 428 of the alignment head 420. The pin or other securing member may be removably positioned into the alignment head 410 and may be in physical contact with the cartridge 463.

Referring to both FIGS. 7A and 7B, the driver member 464 may be a hex-head jack screw that may be threadably inserted through the top of the cartridge 468, 463. Thus the drive member 464 may operate with the cartridge 468, 463 to advance downward toward the plunging body 466 when the drive member 464 is rotated by a tool adapted to turn it; a tool such as an Allen wrench matching the dimension of the hexhead. Those in the art should recognize the various driver heads (flat head, Phillip's head, square head) may be employed to help turn the drive member 464. Moreover, the drive member 464 may be a rod or other element fashioned with wing-nut-type fixtures that a user may easily grasp to help turn the drive member 464. The plunging body 466 of the alignment element 460, 465 is extended toward the structural element 36, 37 by contact forces exerted by the drive member 464 of the alignment element 460 465. Hence, as the drive member 464 threadably advances downward, it pushes on the plunging body 466 extending it downward as well.

Figure 8A:
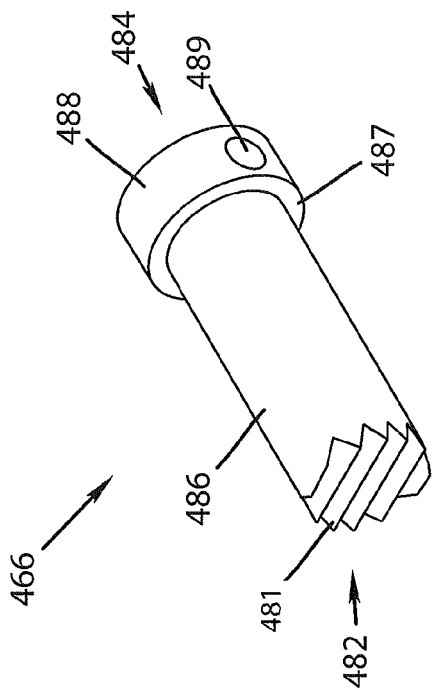
FIG. 8A depicts a side perspective view of an embodiment of a plunging body, in accordance with the present invention.
Figure 8C:
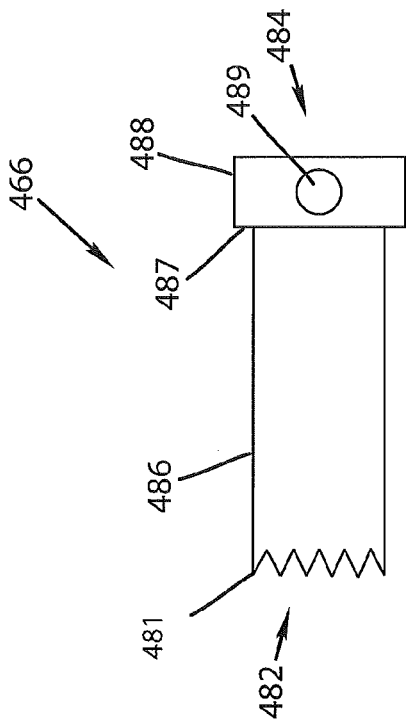
FIG. 8C depicts a side view of an embodiment of a plunging body, in accordance with the present invention.
Figure 8B:
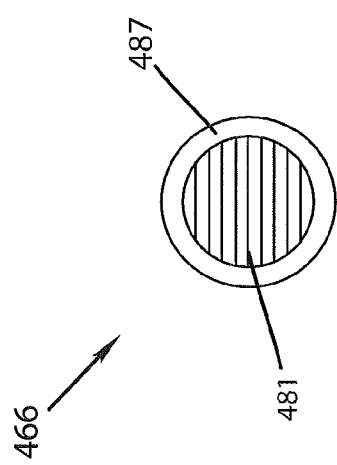
FIG. 8B depicts an bottom end view of an embodiment of a plunging body, in accordance with the present invention.

With continued reference to the drawings, FIGS. 8A-C respectively depict perspective, end and side views of an embodiment of a plunging body 466. The plunging body 466 may include a first end 482 and a corresponding opposite second end 484. The first end 482 of the plunging body 466 may include a connection structure contact area 481. The alignment element 460 structure contact area 481 is a distinguishable extent of the surface of the first end 482 of the alignment element 460 which makes contact with the structural elements 36 and 37, and secures the structural elements 36 and 37 within the jaws 421 and 422. The connection structure contact area 481 may be a surface comprising of teeth, pads, irregular projections, regular projections, grooved recesses, micro-teeth, micro-pads, micro-projections, knurling, and the like. In addition, the connection structure contact area 481 further may have coatings of the aforementioned on the area 481. The structural configuration of the connection structure contact area 481 should be arranged to efficiently and effectively engage and hold fast against a structural element, such as a pipe 36, 37 when the connection structure contact area 481 contacts the structural element 36, 37. Hence, the contact area 481 may be arcuate to and contoured to match the outer curvature of the pipe 36, 37. The matched contour of the contact area 481 of the first end 482 contributes to the prevention of rotation of the plunging body 466 because of greater contact and increased friction with the pipe 36, 37. The contact area should help prevent rotation of the plunging member 466 when engaged with any type of structural element to be aligned. Extending substantially between the first end 482 and the second end 484 of the plunging body 466 may be an elongated plunging body portion 486.

The second end 484 of the plunging body 466 may include an enlarged head member 488. Then enlarged head member may include a spring contact surface 487 configured to engage a spring 469 (see FIGS. 7A-B) and receive spring 469 forces as applied to the plunging body 466. The second end 484 of the plunging body 466 is configured to engage the drive member 464 as the drive member 464 moves and drives the plunging body 466. Accordingly, where drive member embodiments may be moved or advanced via threadable rotation, it is advantageous to have the second end of the plunging body 466 designed to minimize friction and transfer of rotational forces from the drive member 464. The primary interaction of the drive member 464 is to drive the plunging body 466 axially. Hence, an axis of the drive member 464 and an axis of the plunging body 466 may be co-aligned. Thus, the dynamic contact between the drive member 464 and the plunging body 466 may not transfer substantial rotational forces from the drive member 464 to the plunging body 466. The plunging body 466 is rotatably secured and can not rotate. To further prevent any ability for the plunging body 466 to turn about a central axis as a result of rotational forces possibly transferred by the drive member 464, the plunging body 466 can operate with a key slot 489, such as a dimple or other socket-type member designed to receive a ball bearing, a pin, a protrusion or any other key member that acts to physically prevent rotation of the plunging body 466 due to obstruction by the key member. The key member, such as a ball bearing, may be operable with both the plunging body 466 via key slot 489 and may also be operable with a cartridge 468 through a key slot structure 499 on the interior surface of the cartridge 468. Similar key slot 499 structuring may also correspond to the cartridge 463.

By way of example, FIGS. 9A-E respectively depict vertical side, perspective, bottom end, top end, and horizontal side views of an embodiment of a cartridge 468 of an embodiment of an alignment element 460. The cartridge 468 includes a first end 492 and corresponding opposite second end 494. For practical purposes, the first end 492 may correspond to the bottom end of the cartridge 468, or the end of the cartridge 468 oriented toward the alignment head 420 and structural elements 36, 37. The second end 494 of the cartridge 468 may correspond to the top end of the cartridge 468. Extending from the first end 492 into the cartridge 468 may be a generally cylindrical interior hollow 498 having a substantially constant diameter. Located on a side of the interior hollow 498 may be a vertical key slot 499 running parallel to a central axis of the alignment element 460. The key slot 499 may extend for the entire length of the hollow. The diameter or cross-section of the key slot 499 in the interior hollow 498 of the cartridge 468 should correspond to the diameter of the dimple key slot 489 of the plunging body 466. Hence a ball bearing (not shown) may be positioned within the dimple 489 of the plunging body 466 and also within the vertical slot 499 of the cartridge 468 to securely retain the plunging body 466 and the cartridge 468 in non-rotatable relation to each other while still permitting linear axial movement of the separate components. Accordingly, the plunging body 466 and cartridge 468 are generally secured about a central axis of the alignment element 460 so that neither the plunging body 466 nor the cartridge 468 can substantially rotate with respect to the other. Rotation of the plunging body 466 is physically prevented. Thus, the drive member 464, being operable with the cartridge 468 of the alignment element 460, may extend the plunging body 466 without rotating the plunging body 466 with respect to the cartridge 468 or the engaged structural element 36, 37. Because the plunging body 466 does not rotate, but merely extends axially, with respect to the alignment element 460, the plunging body 466 does not transfer any rotational forces onto the structural element 36, 37 when the plunging body 466 engages and moves the structural element 36, 37 during the alignment process.

Extending into the cartridge 468 from the second end 494 of the cartridge 468 may be a threaded hole 493. The threaded hole 493 may be configured having a diameter and thread count to receive and operate with the drive member 464. Therefore, as the drive member 464 is rotated, it may be threadably advanced either toward or away from the plunging body 466 housed at least partially within the interior hollow 498 of the cartridge. To further assure that the cartridge 468 does not rotate due to forces exerted on it by the drive member 464, and to generally retain the cartridge 468 in a desired location and orientation, embodiments of the cartridge 468 may include one or more flat surfaces 495 located on an elongated outer cartridge portion 496. The flat surface(s) 495 may be operable with a set screw (not shown, but well known in the art) extending through the alignment head 420 to abut the flat surface 495. The attachment of the alignment element 460 to the alignment head 420 may be facilitated at least in part by the set screw. Hence, the cartridge 468 may be inserted into the hole 427 of the pipe alignment head 420 and threadably advanced until the cartridge 468 reaches a location where the set screw extending through a hole (not shown) in the side of the head 420 may contact the flat face 495 of the cartridge 468 and prevent the cartridge 468 from rotating and threadably advancing, in either direction any further. Thus the operable employment of the set screw may serve to secure the cartridge 468, and the plunging body 466 (due to the associated ball bearing) in a rotationally static position with respect to each other and the head 420.

The plunging body 466 of an alignment element 460 may be non-rotatably moved to contact one of the first structural element, such as a pipe 36, or the second structural element, such as a pipe 37, depending on which structural element 36, 37 resides beneath the alignment element 460 when the structural element 36, 37 is removably secured proximate the alignment head 420. It should be noted that a plurality of alignment elements 460 may be included on one alignment head 420 (see FIG. 6). Hence, in an arrangement where a first alignment element 460 contacts a first structural element 36, at least another alignment element 460 may also be simultaneously attached to the head 420, wherein the other alignment element 460 also includes a plunging body 466 that is configured to engage a structural element, such as the second pipe 37, and move the second pipe 37 into alignment with the first pipe element 36. The number of alignment elements 460 provided on an alignment head may correspond to the size of the structural element to be aligned. For example, large straight pipe pieces, pipe fittings, beams, or sheets, etc, may include more alignment elements 460 than small pipes, pipe fittings, beams, or sheets.

The alignment elements 460, 465 operable with the aligning device 4, may vary in size and dimension. Furthermore, the alignment element(s) 460, 465 may be integrally attached to the alignment head 420 rather than non-integrally, or removably attached to the alignment head 420. The alignment element(s) 460, 465 may be constructed of materials including but not limited to steel, aluminum, iron, copper, brass, ceramic composites, polymer composites, nano-polymer composites, alloys of the aforementioned, and combinations thereof. The construction materials, as previously described, to form the alignment element(s) 460, 465 are not meant to limit the scope of the materials that may be used in embodiments of the present invention. Any tack weld resistant material having physical and chemical properties to withstand temperatures and pressures typically generated under tack welding conditions can be used to form the pipe alignment element(s) 460, 465 in accordance with the device and method of the present invention.

With reference to FIGS. 1-3 and 6-9E, a pressure mechanism 470 may be included with the pipe alignment device 4, in accordance with embodiments of the present invention. The pressure mechanism 470 may be oriented anywhere with the handle 450 to provide a desired degree of mechanical advantage. Additionally, work windows 23 may provide a visual confirmation that a chosen or specific tack weld gap 38 clearance between the pipe elements 36 and 37 has been achieved, and also may allow the user to quantitatively, i.e., measure the tack weld gap 38 and axial alignment using typical weld gap 38 and axial alignment measuring devices. The work windows 23 also allow the user to inscribe or mark into the pipe elements 36 and 37, in the vicinity of the tack weld, any specifications of the tack weld or information that a user may wish to convey about the tack weld. Furthermore, the characteristics of aligning device 1 of possibly having an alignment head 20 that is reversibly attachable also applies to the aligning device 4. Thus the aligning device 4 may also allow for the use of one handle 450 and one pressure mechanism 470 with a wide variety of different sized alignment heads 420 and/or alignment elements 460, 465 for aligning and tack welding structural elements 36 and 37 of varying sizes. Various, pipes, rods, beams, angle-iron, I-beams, L-beams, hand-railings, flats, sheets, or other structures may be aligned for connection by embodiments of an aligning device 4.

Figure 10A:
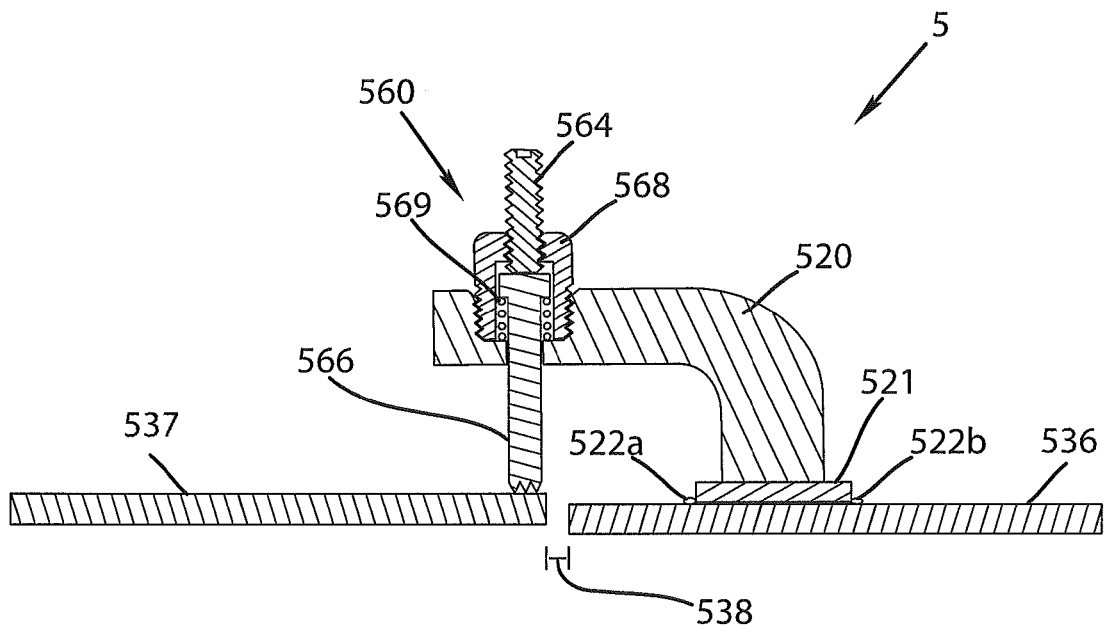
FIG. 10A depicts a side sectional view of still another embodiment of an aligning device prior to alignment of structural elements, in accordance with the present invention.
Figure 10B:
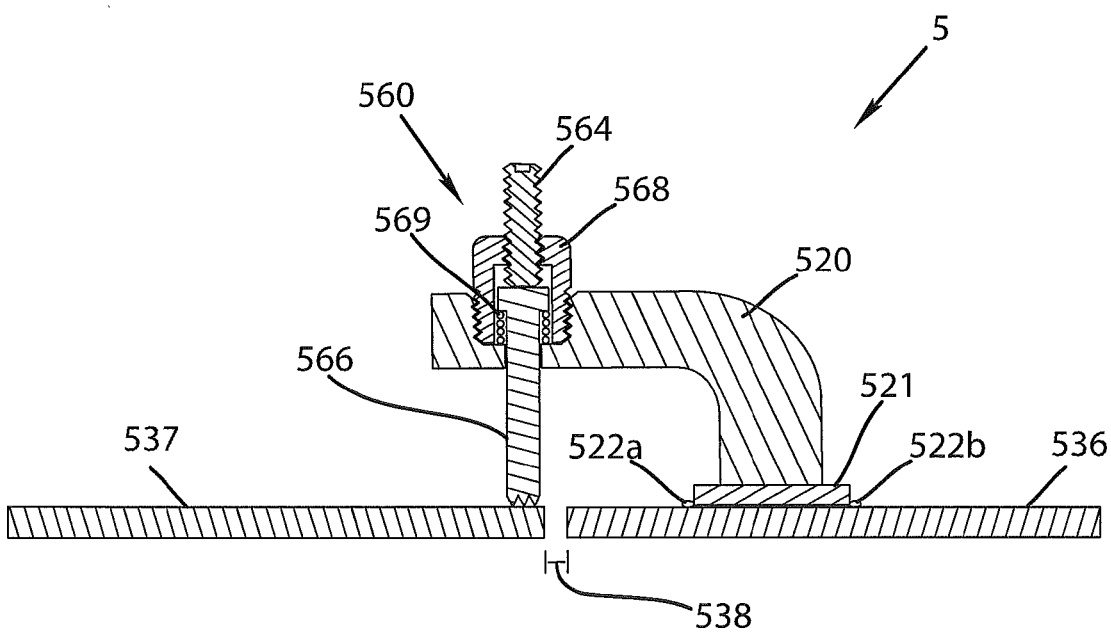
FIG. 10B depicts a side sectional view of the embodiment of the aligning device of FIG. 10A following alignment of structural elements, in accordance with the present invention.

With continued reference to the drawings, FIGS. 10A-B depict side sectional views of still another embodiment of an aligning device 5 prior to and also following alignment of structural elements 536 and 537. As depicted, the structural elements 536 and 537 are two flat sheets of metal. However, those in the art should appreciate that various structural elements, such as pipes, rods, beams, angle-iron, I-beams, L-beams, hand-railings, flats, sheets, or other structures, may be aligned for connection by embodiments of an aligning device 5. An aligning device 5 may include an alignment head 520. The alignment head 520 may include a base 521. The base 521 may be configured to be removably mounted to a structural element 536 proximate an end of the structural element 536. Removable mounting may be facilitated by tack welds 522a and 522b that connect the base 521 of the alignment head 520 to the structural element 536. The tack welds 522a-b should be sufficient enough to secure the aligning device 5 in appropriate position of helping the alignment and connection of structural elements 536, but should also be provided so as to allow a user to pry and/or pop the welds off once alignment and connection of the structural elements 536, 537 has taken place. Other means of connecting the base 521 of the alignment head 520 to the structural element 536 may include magnets, glues, epoxies, bolts and nuts, screws, rivets, hook-and-loop fasteners, clamps, clips, and/or other like connection means.

Referring further to FIGS. 10A-B, embodiments of an aligning device 5 may include at least one alignment element 560. The at least one alignment element 560 may be removably attached to the alignment head 520. An alignment device 5 may have multiple alignment elements 560. As depicted, the alignment element 560 is similar to that shown in FIG. 7A. However, those in the art should appreciate that various embodiments of alignment elements may operate with an aligning device 5. For instance, the alignment elements 560 may be similar to the alignment element 465 shown in FIG. 7B, with corresponding changes to the alignment head 520. Moreover, the alignment elements 560 may be similar to the alignment elements 60 shown in FIGS. 1-4F, wherein the alignment head 520 may have physical changes corresponding to the operable attachment of the alignment elements 60 thereto. In every embodiment of an alignment element, the plunging body is rotatably secured so that it can not rotate.

An aligning device 5 includes a plunging body 566. The plunging body 566 may operate with a drive member 564, such as a screw or other threaded object. Moreover the plunging body 566 may contact the drive member 564 as assisted by a spring 569. Furthermore, the plunging body 566 may operate with a cartridge 568 to help orient the plunging body 566 with respect to the alignment head 520 and facilitate plunging from the alignment head 520.

As depicted in FIG. 10A, the flat structural element 537 is not properly aligned for connection with the flat structural element 536. Proper alignment, with regard to the depicted structural elements 536, 536, means that the end of the structural element 536 is substantially co-planar with the end of the structural element 537 as depicted in FIG. 10B. Those in the art should appreciate that alignment may consist of any user-preferred configuration and that proper alignment, as used herein, is provide for exemplary purposes of demonstrating how an aligning device 5, may be utilized to help align structural elements for connection. Thus, it can be seen that the plunging body 566 may be advanced by the drive member 564 to work upon the structural element 536 and move it into proper alignment. Windows or other means (not shown) may be incorporated into the alignment head 520 to allow a user to weld or otherwise access to two structural elements 536, 537 during or following alignment. Moreover, at tack shim, such as tack shim 105, may be incorporated into the design to help maintain and appropriate weld gap, such as gap 538.

Figure 11:
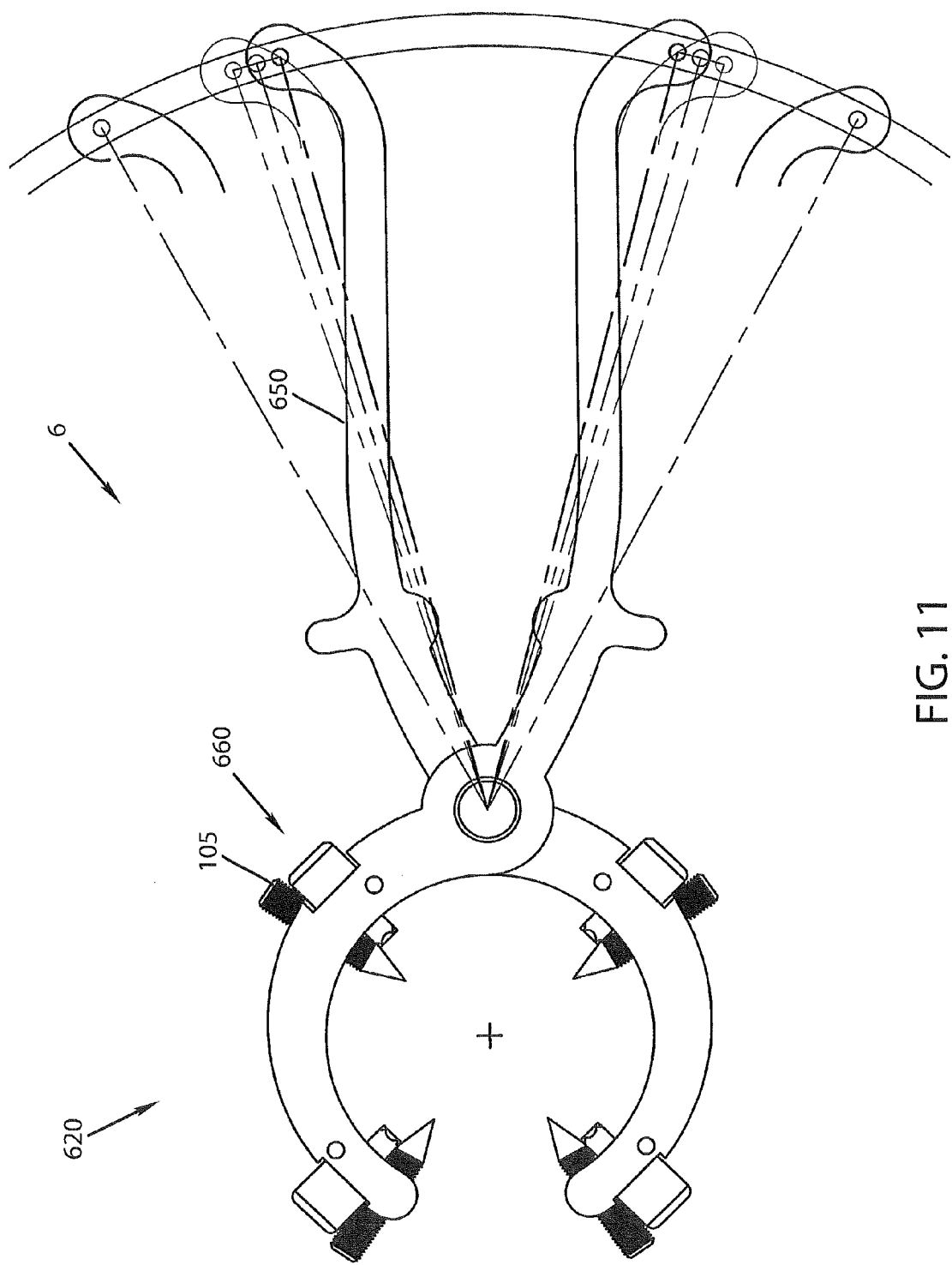
FIG. 11 depicts a side view of a further embodiment of an aligning device, wherein the handle is depicted in a range of positions, in accordance with the present invention.
Figure 12:
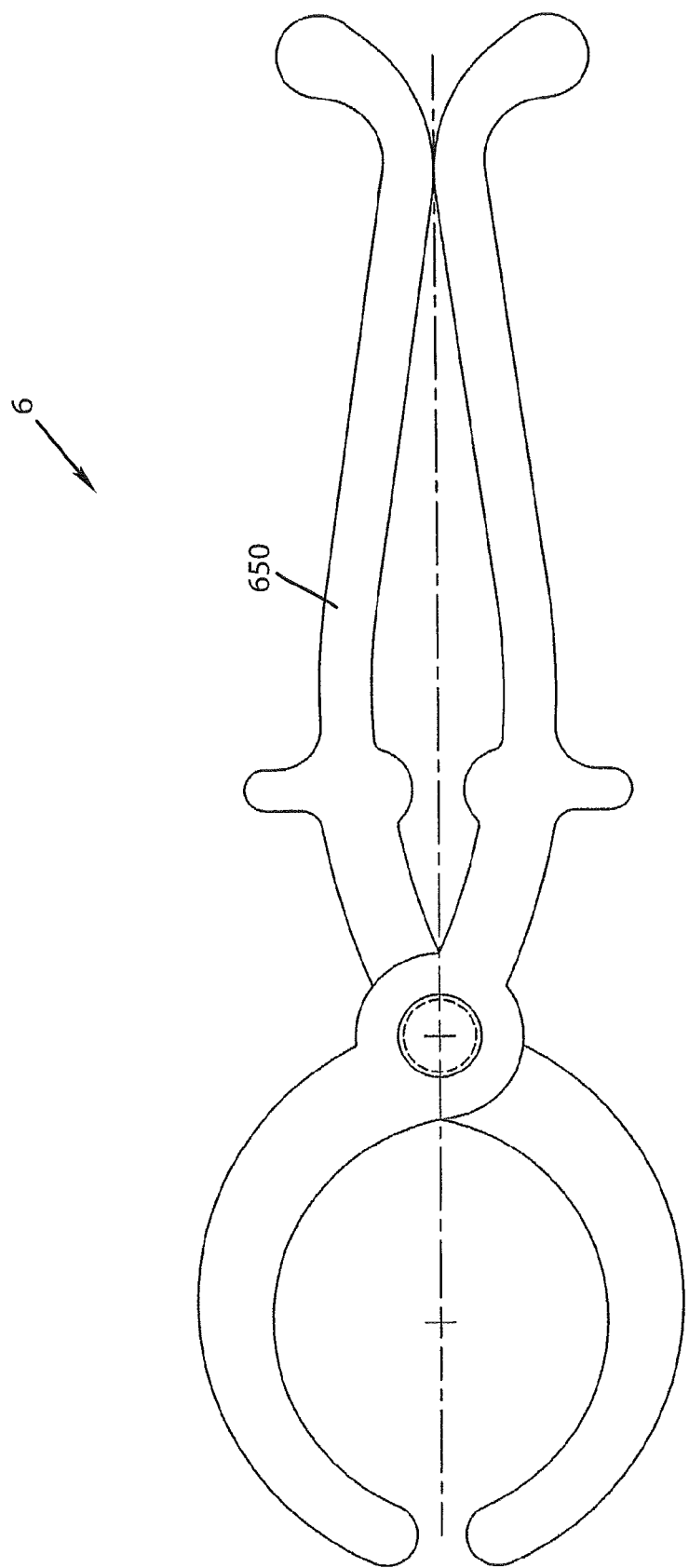
FIG. 12 depicts a side view of the embodiment of the aligning device of FIG. 11 without alignment elements or tack shims shown, wherein the handle is depicted in a fully closed position, in accordance with the present invention.
Figure 13:
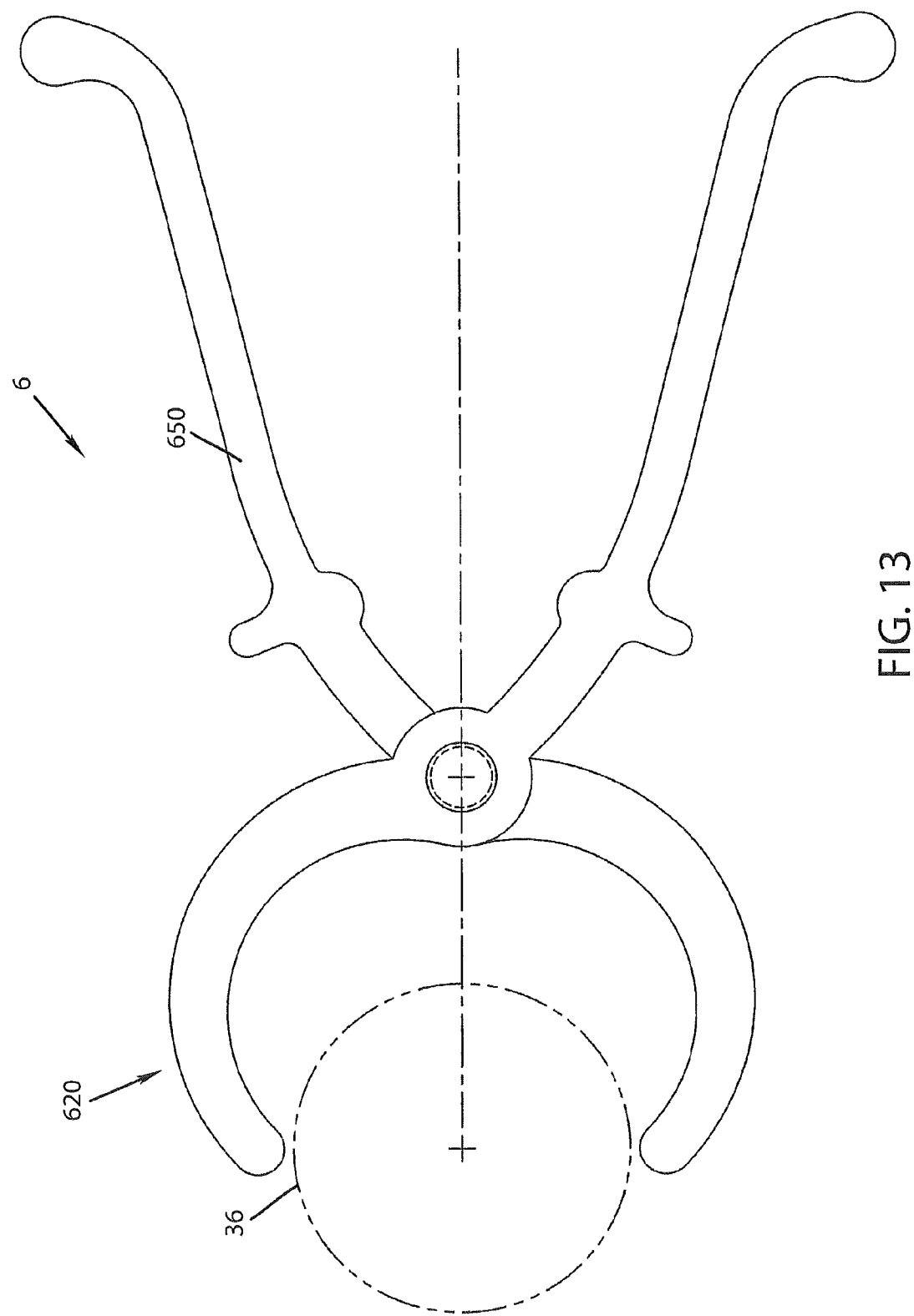
FIG. 13 depicts a side view of the embodiment of the aligning device of FIG. 11 without alignment elements or tack shims shown, wherein the handle is depicted in a fully open position allowing a structural element to be inserted within the alignment head, in accordance with the present invention.
Figure 14:
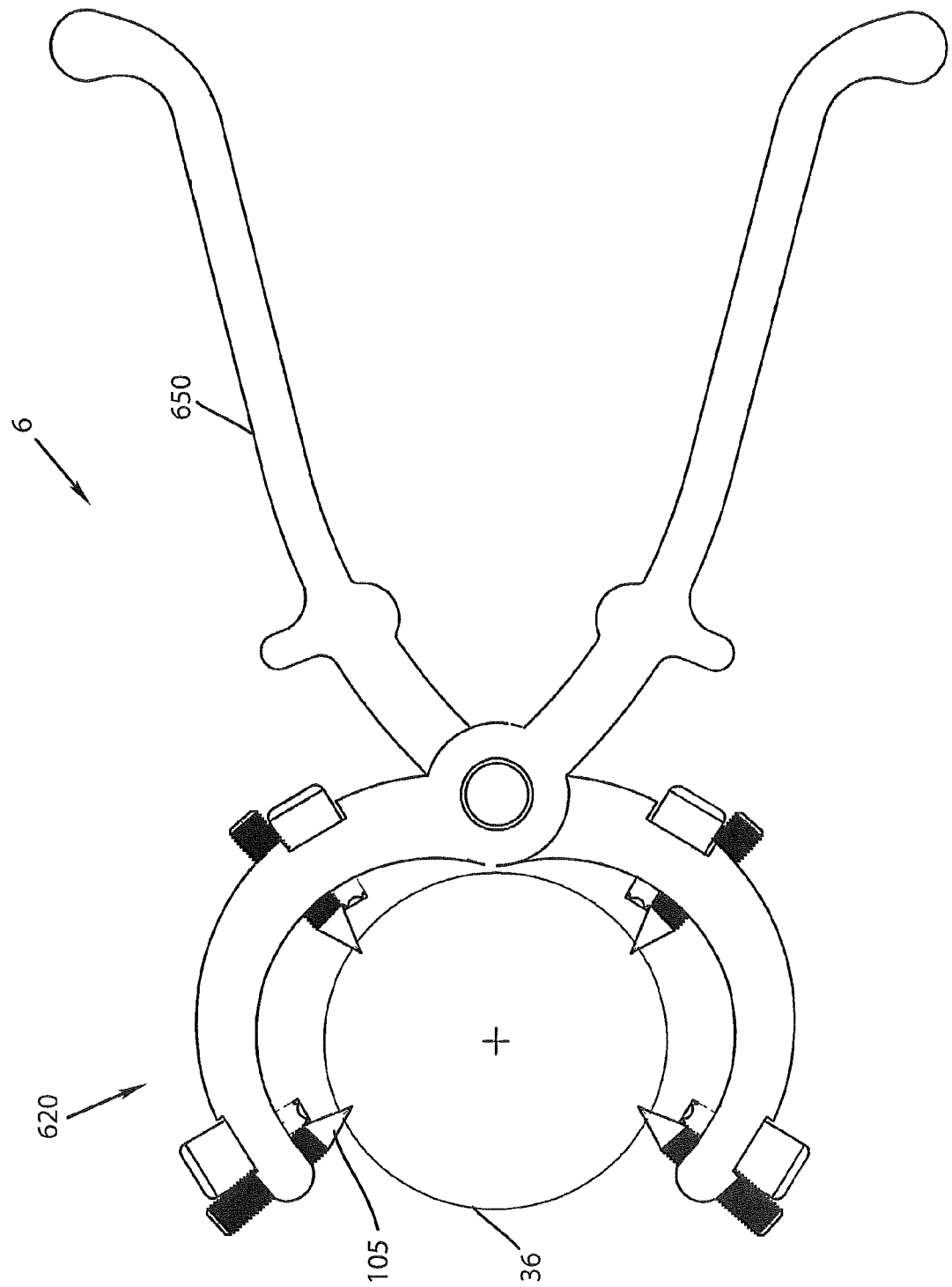
FIG. 14 depicts a side view of the embodiment of the aligning device of FIG. 11, wherein the structural element has been inserted within the alignment head while the handle is in an open position, in accordance with the present invention.

With still further reference to the drawings, FIG. 11 depicts a side view of a further embodiment of an aligning device 6, wherein the handle 650 is depicted in a range of positions. The depiction is provided merely to show an illustrative range of movement of the handle 650. Although, other features of the alignment device 6 would move in relation to the movement of the handle, the movement of such other features is not provided. The alignment element 660, may be similar to the alignment element 465 (shown in FIG. 7B). However, the drive member 664 (similar to the drive member 464) may be seated within the alignment element 660 so that it is not visible in a side view. The spring 669 (similar to the spring 469) is also not visible in the side view of alignment device 6 shown in FIG. 11. The tack shim members 105 are visible and are operable with the alignment head 620 of the alignment device 6. FIG. 12 depicts a side view of the embodiment of the aligning device 6 of FIG. 11. However, for clarity, the device 6 is depicted without alignment elements 660 or tack shims 105 being shown. The depiction of FIG. 12 reveals one portion of the range of the handle 650 of the aligning device 6, wherein the handle 650 resides in a fully closed position. In further description of operable movement, FIG. 13 depicts a side view of the embodiment of the aligning device 6 of FIG. 11 (also without alignment elements 660 or tack shims 105 shown), wherein the handle 650 is depicted in a fully open position allowing an embodiment of structural element 36, such as a pipe, rod, tube, beam or other structure, to be inserted within the alignment head 620. Accordingly, FIG. 14 depicts a side view of the embodiment of the aligning device 6 of FIG. 11, wherein the structural element 36 has been inserted within the alignment head 620 while the handle 650 is in an open position.

Figure 15:
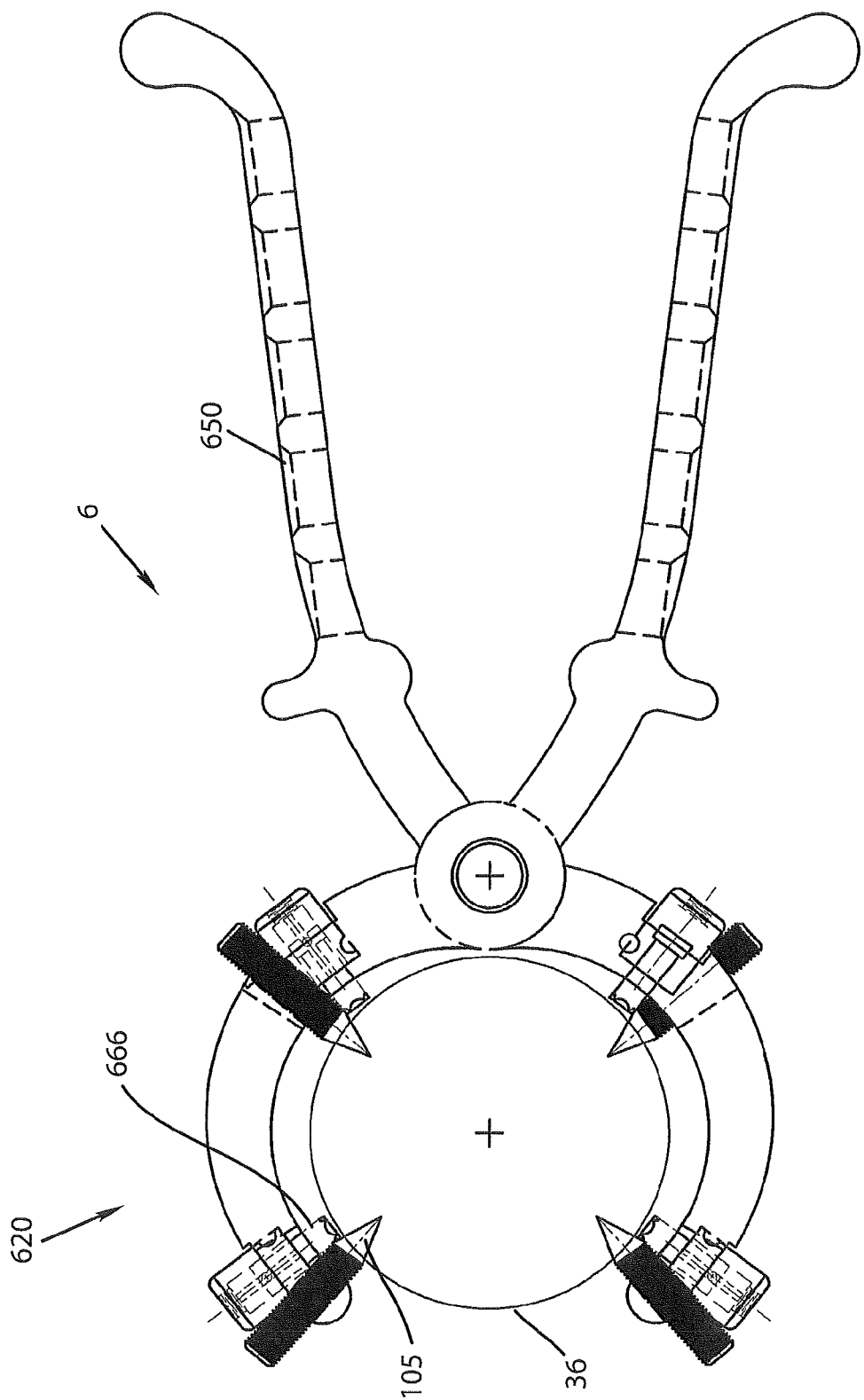
FIG. 15 depicts a side view of the embodiment of the aligning device of FIG. 11, wherein the structural element has been inserted within the alignment head while the handle is maneuvered toward a closed position bringing the alignment elements closer to the structural element, in accordance with the present invention.
Figure 16:
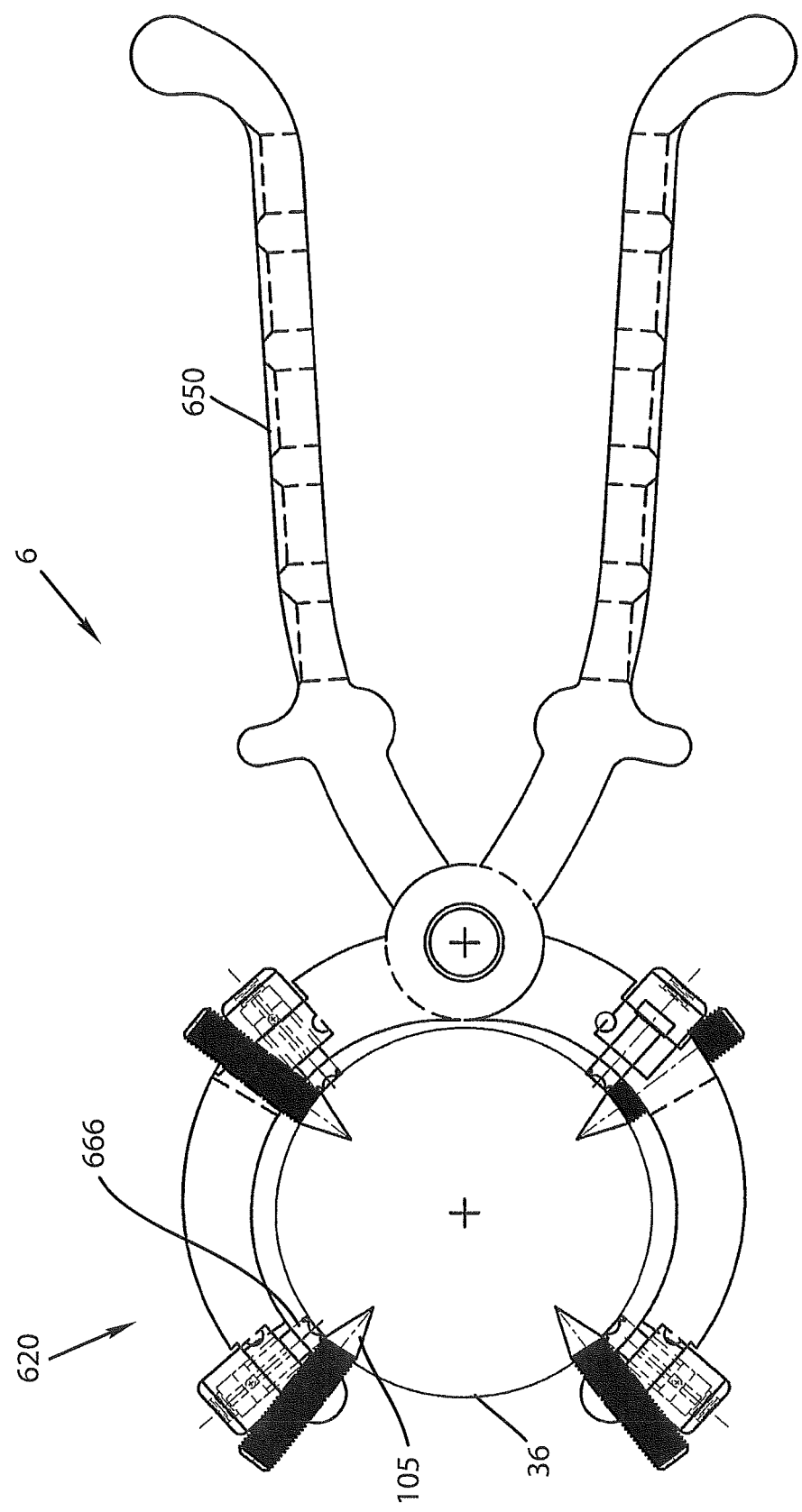
FIG. 16 depicts a side view of the embodiment of the aligning device of FIG. 11, wherein the structural element has been inserted within the alignment head while the handle is maneuvered further toward a closed position bringing the alignment elements into contact with the structural element, in accordance with the present invention.

Embodiments of an aligning device can be used to align structural elements of various sizes and shapes. For example, and aligning device 6 may be configured to facilitate alignment of pipes having various diameters ranging from ½ inch to 10 inches. Accordingly the size the aligning device 6 including the alignment head 620 and the handle 650 and all other components may vary relative to desired use, such as for smaller pipes or larger pipes. Furthermore, embodiments of an aligning device may be configured to facilitate alignment of angled or bent pipe fixtures or connection pieces, square or rectangular tubing, angle iron, channels, flats, I-beams, or other structural members to be aligned and connected. As such, embodiments of aligning devices may be configured to place alignment elements, such as elements 660, in close proximity with structural elements 36 or 37, so that the alignment elements be utilized to act upon the structural elements 36 or 37 and move them into alignment with each other. For example, FIG. 15 depicts a side view of the embodiment of the aligning device 6 of FIG. 11, wherein the structural element 36 has been inserted within the alignment head 620 while the handle 650 is maneuvered toward a closed position bringing the alignment elements 660 closer to the structural element 36. When the alignment elements 660 have been brought securely into close proximity with the structural elements 36 or 37 then the alignment elements 660 may be made to contact and hold or work upon and move the structural elements 36 or 37. For instance, FIG. 16 depicts a side view of the embodiment of the aligning device 6 of FIG. 11, wherein the structural element 36 has been inserted within the alignment head 620 while the handle 650 is maneuvered further toward a closed position bringing the alignment elements 660 into contact with the structural element 36. Once in this position, drive members 664 (not shown) may be manipulated to move the plunging bodies 666 and thereby move the structural member 36. Similar with the description above, drive members 664 move plunging bodies 666 without rotating plunging bodies 666 so that the plunging bodies 666, as they are in contact with the structural element 36 or 37, do not transfer any rotational force onto the structural elements 36 or 37. This is advantageous because alignment movement can be much more readily controlled and the structural elements 36 and/or 37 may be much more effectively secured into proper alignment.

Figure 17:
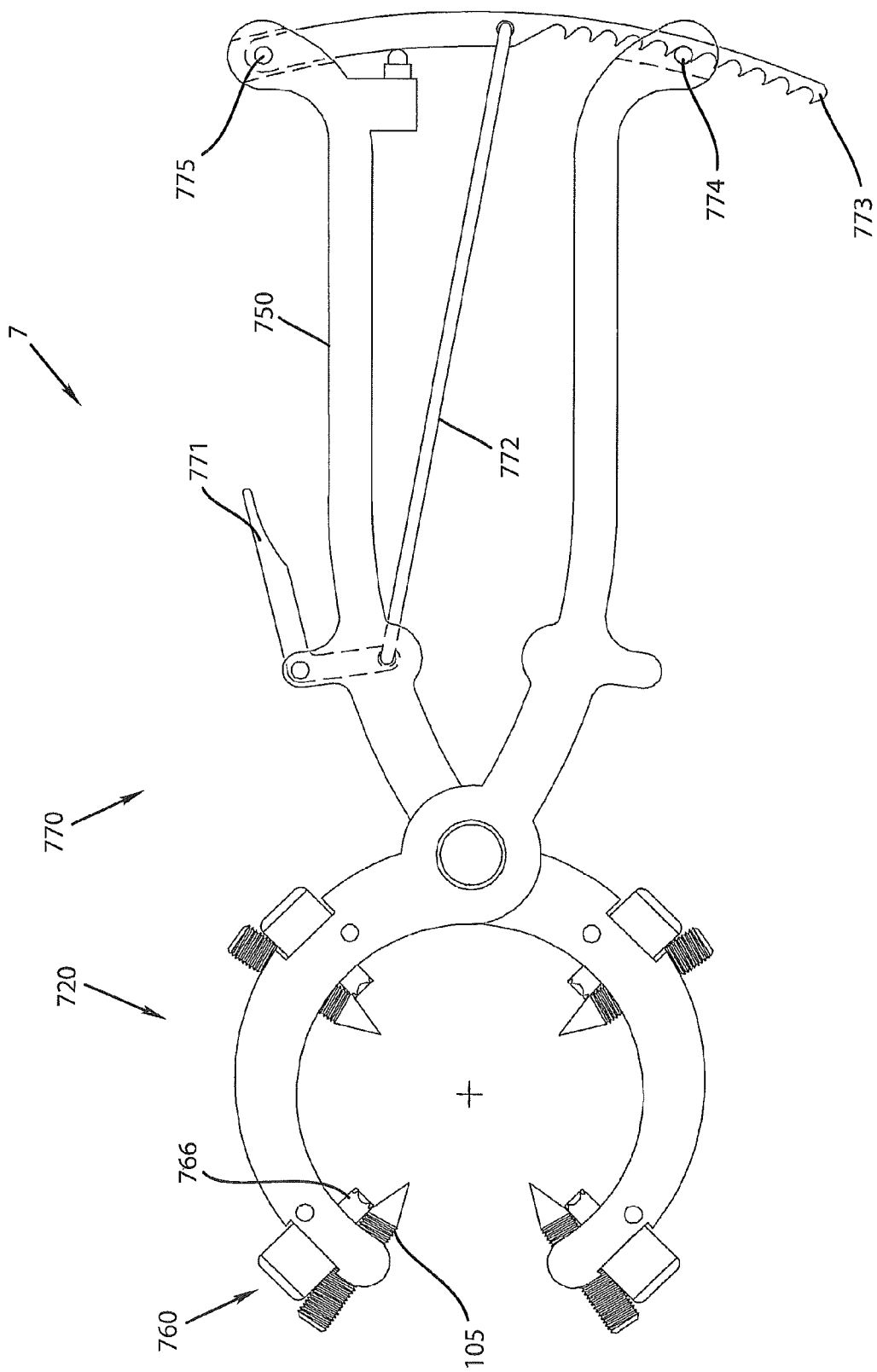
FIG. 17 depicts a side view of a still further embodiment of an aligning device having a pressure mechanism including a manually activated pawl ratchet, in accordance with the present invention.

Those in the art should appreciate that the movement of various components of embodiments of an aligning device may be assisted, enhanced, controlled, or otherwise modified by mechanical, hydraulic, pneumatic, or electric motor means. For example, FIG. 17 depicts a side view of a still further embodiment of an aligning device 7 having a pressure mechanism 770 including a manually activated pawl ratchet 773. Teeth of the pawl ratchet 773 may engage a pin 774, or other complimentary structure serving to prevent movement of the handle 750 in an open direction while the pawl ratchet 773 is engaged. The pawl ratchet 773 may pivot at a location 775 operable with an arm of the handle 750. Moreover, a connection member 772 may link the pawl ratchet 773 to a release tab 771 that may be operated by a user to disengage the pawl ratchet 773 from the pin 774 and permit opening movement of the handle 750. Accordingly, a user may operate the aligning device 7 by using the release tab 771 to disengage the pawl ratchet 773 to allow the handle 750 to move to an open position so that the alignment head 720 may open wide to receive a structural element, such as structural element 36 or 37. Then the user may compress the handle 750 so that the alignment elements 760 are moved into close proximity or contact with the structural element 36 or 37. The closing of the handle 750 may act in conjunction with ratcheting of the pawl ratchet 773 so that the handle 750 steps securely toward a closed position and facilitates a secure connection with the structural member 36 or 37. When the structural element 36 and/or 37 has been secured, then the plunging bodies 766 of the alignment elements 760 may be driven by drive members (not visible) to move the structural element 36 and/or 37 into proper alignment position.

While the alignment device 7 is shown with a manually operated mechanical pressure mechanism 770 including a pawl ratchet 773, those in the art should recognize that other devices or implements may be included in an alignment device embodiment to assist, enhance, control, or otherwise modify movement of an alignment head into closer proximity with a structural element, such as element 36 and/or 37 to be aligned. For example, a manually actuated double pawl ratchet may be included with a pressure mechanism, such as pressure mechanism 770 of aligning device 7. Moreover, a worm gear thread device may be provide and may be manually or electrically operable. Furthermore, a hydraulic pump-assist activation mechanism may be included to help a user close the handle 750 or otherwise move an alignment head into closer proximity with a structural element, such as element 36 and/or 37, to be aligned. Still further, an air cylinder compressed-air-activation mechanism may be provided to add or retain pressure during operation of the aligning device 7 and otherwise secure a structural element into proper alignment position. The various means for movement assistance may be configured to function in correlation with the aspects of aligning device embodiments.

An embodiment of a pipe aligning method is described with relation to FIGS. 1-17. One methodological step of structural connection aligning may include providing an end of a first structural element 36 and an end of a second structural element 37. Another methodological step may include providing an aligning device 1, 4, 5, 6, 7 including a respective head 20, 420, 520, 620, 720 configured to be removably positioned proximate the end of the first structural element 36; the aligning device 1, 4, 5, 6, 7 further including an alignment element 60, 460, 465, 560, 660, 760 respectively attached to the head 20, 420, 520, 620, 720; the alignment element 60, 460, 465, 560, 660, 760 having a respective plunging body 66, 466, 566, 666, 766 extendable from the head 20, 420, 520, 620, 720. A further methodological step of structural connection aligning may include extending the plunging body 66, 466, 566, 666, 766 from the head 20, 420, 520, 620, 720 to non-rotatably engage the second structural element 37 because the plunging body 66, 466, 566, 666, 766 is prevented from rotating. Moreover, a still further methodological step may include moving the non-rotatably engaged second structural element 37 via extension of the plunging body 66, 466, 566, 666, 766 to align the end of the second structural element 37 with the end of the first structural element 36.

Further structural connection aligning methodology may include the plunging body 66, 466, 566, 666, 766 of the respective alignment element 60, 460, 465, 560, 660, 760 being extended by contact forces exerted by a drive member 64, 464, 564, (664 and 764 not shown in side view, but similar in structure and functionality) of the alignment element 60, 460, 465, 560, 660, 760 such that the drive member 64, 464, 564, 664, 764 (all drive members optionally being operable with a cartridge 468 of the alignment element 460, 465) operably extends the plunging body 66, 466, 566, 666, 766 without rotating the plunging body 66, 466, 566, 666, 766 with respect to the engaged second structural element 37.

Still further methodology may include contact between the plunging body 66, 466, 566, 666, 766 and the drive member 464, 564, 664, and 764 being at least partially facilitated by a spring 469, 569, (664 and 764 not shown in side view, but similar in structure and functionality) positioned between the plunging body 466, 566, 666, 766 and the head 420, 520, 620, 720 to exert force upon the plunging body 466, 566, 666, 766 in a direction toward the drive member 464, 564, (664, 764 not shown).

Even further still, additional structural connection aligning methodology may include the head 20, 420, 620, 720 being removably connected to a respective handle 50, 450, 650, 750 the head 20, 420, 620, 720 being configured to open or close as the handle 50, 450, 650, 750 is squeezed or spread. Moreover, the structural connection aligning methodology may include the provision of another alignment element 60, 460, 465, 560, 660, 760 being attached to the head 20, 420, 520, 620, 720 wherein the other alignment element 60, 460, 465, 560, 660, 760 also includes a respective plunging body 66, 466, 566, 666, 766 configured to engage the second structural element 37 and move the second structural element 37 into alignment with the first structural element 36.

In addition, an embodiment of a structural connection aligning method may include setting a tack weld gap 38 via extension of a tack shim 105 from the head 20, 420, 520, 620, 720. Having accurately and precisely aligned the structural elements 36 and 37, the tack weld gap 38 typically then is set using the tack weld gap shim 105. A tack weld shim end 106 of the tack shim 105 is inserted between the ends of the structural elements 36 and 37 via the adjustment head 108. In this example, the tack shim 106 comprises a threaded shaft 107 and a conical end 106 that is demarcated. The head 108 is turned or rotated in a clockwise direction causing the shim 105 and more specifically the conical end 106 to move towards/into the tack weld gap 38. For example, each demarcation may be equivalent to 4 mm of space between the ends of the structural elements 36 and 37. Inserting the end 106 of the tack shim 105 to the $4^{th}$ demarcation may be equivalent to setting the tack weld gap 38 to 16 mm.

Alternatively, each demarcation could be equivalent to 1 mm, 2 mm, 3 mm or any unit of distance typically used for tack weld gaps 38 and tack welding conditions. The tack weld gap 38 can be set from about ⅛ inch to about ⅕ inch. After having set the tack weld gap 38, a user may then connect and tack weld the ends of the structural elements 36 and 37 knowing that the structural elements 36 and 37 have been accurately and precisely aligned using the aligning device 1, 4, 5, 6, 7 and the tack weld gap 38 is set per the user's requirement. The pipe aligning device 1, 4, 5, 6, 7 engaging the structural elements 36 and 37, aligned for proper connection and having a chosen tack weld gap 38, may be held and/or operated by one hand while the user's other hand may be utilized to hold and operate a welding torch for subsequent tack welding. After tack welding is completed, the user removes the tack weld shims 105 from the tack weld gap 38 and may finish welding or otherwise connecting the properly aligned and tack-joined structural elements 36, 37

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention. Thus, the foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:
1. A structural connection aligning device comprising:
an alignment head configured to be removably secured proximate an end of a first structural element;
an alignment element attached to the alignment head, the alignment element having a rotatably secured plunging body that extends from the alignment head and engages an end of a second structural element when the alignment head is removably secured proximate the end of the first structural element;

a cartridge fit into the alignment head operable with the plunging body such that neither the plunging body nor the cartridge can substantially rotate with respect to each other; and a securing member placed to interfere with the retractability of the cartridge after it has been appropriately fit into the alignment head.

2. The device of claim 1, wherein the alignment element further comprises a drive member that contacts the plunging body to move and extend the plunging body.

3. The device of claim 1, wherein the alignment head is removably secured proximate the end of the first structural element via tack welding a base of the head to the first structural element.

4. The device of claim 1, wherein the alignment head is removably secured proximate the end of the first structural element via operation of a handle which moves the head so that at least a portion of the device securely engages the first structural element.

5. The structural connection aligning device of claim 1, wherein the plunging body includes a first end that is configured to contact the second structural element, and wherein the plunging body includes a flat enlarged head member configured to contact a drive member, the drive member configured to drive the flat enlarged head member of the plunging body toward the second structural element.

6. A structural connection aligning device comprising:
an alignment head;
at least one alignment element attached to the alignment head, the at least one alignment element having a plunging body extendable from the alignment head, wherein the plunging body includes an enlarged head member and a contact area contoured to match a curved outer surface shape of a structural element to be aligned by the aligning device;
a drive member, wherein the drive member contacts the enlarged head member of the plunging body to move the plunging body;
a cartridge fit into the alignment head operable with the plunging body such that neither the plunging body nor the cartridge can substantially rotate with respect to each other; and
a securing member placed to interfere with the retractability of the cartridge after it has been appropriately fit into the alignment head.

7. The device of claim 6, wherein the drive member moves the plunging body without rotating the plunging body.

8. The device of claim 7, wherein the drive member is operably attached to a threaded hole of the cartridge to threadedly advance toward or away from the plunging body.

9. The device of claim 6 further comprising a pressure mechanism configured to assist a movement of the alignment head.

10. The device of claim 6 further comprising a spring positioned between the alignment head and the plunging body.

11. The device of claim 6 wherein the cartridge includes a flat surface to retain the cartridge in a desired location and orientation.

12. The device of claim 6, wherein the enlarged head member is flat.

13. The structural connection aligning device of claim 6, wherein the drive member rotates in order to drive the plunging body.

14. The structural connection aligning device of claim 6, further comprising a spring located between the plunging body and the cartridge, the spring configured to bias the plunging body toward the drive member.

15. A structural connection aligning device comprising:
an alignment head;
at least one alignment element attached to the alignment head, the at least one alignment element having a plunging body extendable from the alignment head;
a drive member, wherein the drive member contacts the plunging body to move the plunging body; and
a cartridge fit into the alignment head operable with the plunging body such that neither the plunging body nor the cartridge can substantially rotate with respect to each other;
wherein the plunging body includes an enlarged head member at an end proximate the drive member, and wherein the drive member contacts the plunging body by pressing against the head enlarged head member, and wherein the drive member drives the plunging body toward the structural element when the structural element is being aligned by the aligning device.

16. The structural connection aligning device of claim 15, wherein the enlarged head member is flat.

17. The structural connection aligning device of claim 15, wherein the drive member rotates in order to drive the plunging body.

18. The structural connection aligning device of claim 15, further comprising a spring located between the plunging body and the cartridge, the spring configured to bias the plunging body toward the drive member.

19. The structural connection aligning device of claim 18, wherein the spring is located between the plunging body and the alignment head.

* * * * *